United States Patent
Tanahashi

(10) Patent No.: US 9,849,977 B2
(45) Date of Patent: Dec. 26, 2017

(54) SITE MANAGEMENT SYSTEM, IN-FLIGHT DETECTION METHOD, AND NON-TRANSITORY COMPUTER READABLE MEDIUM STORING PROGRAM OF SITE MANAGEMENT SYSTEM

(71) Applicant: Kabushiki Kaisha TOPCON, Tokyo (JP)

(72) Inventor: Atsushi Tanahashi, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 170 days.

(21) Appl. No.: 14/860,072

(22) Filed: Sep. 21, 2015

(65) Prior Publication Data

US 2017/0001723 A1    Jan. 5, 2017

(30) Foreign Application Priority Data

Jun. 30, 2015    (JP) .................................. 2015-131668

(51) Int. Cl.
*B64C 29/02*    (2006.01)
*B64C 29/00*    (2006.01)
(Continued)

(52) U.S. Cl.
CPC ........ *B64C 29/0033* (2013.01); *B64C 39/024* (2013.01); *B64D 47/08* (2013.01);
(Continued)

(58) Field of Classification Search
CPC ....... B64C 29/00–29/04; B64C 39/024; B64C 2201/123; G05D 1/0011; G05D 1/0027;
(Continued)

(56) References Cited

U.S. PATENT DOCUMENTS

2009/0237639 A1    9/2009  Shinozaki et al.
2015/0022656 A1*   1/2015  Carr .................... G06K 9/0063
                                                        348/117
(Continued)

FOREIGN PATENT DOCUMENTS

JP    2009-229222 A    10/2009

OTHER PUBLICATIONS

Uriah, "Multi Tilt Rotor Plane System Design," May 2014, https://www.rcgroups.com/forums/showthread.php?2166752-Multi-Tilt-Rotor-Plane-System-Design.*

(Continued)

*Primary Examiner* — Spencer D Patton
(74) *Attorney, Agent, or Firm* — Blank Rome LLP

(57) ABSTRACT

A site management system includes an unmanned airplane being switchable between an airplane mode for high speed flight and a VTOL mode for low speed flight, a working vehicle working in a civil construction site, a shape detection sensor provided in the unmanned airplane to detect a shape of the civil construction site, and an external control apparatus that controls flight of the unmanned airplane, driving of the working vehicle, and driving of the shape detection sensor. The external control apparatus moves the unmanned airplane to an observation area by performing the high speed flight. Further, the external control apparatus detects a shape of the observation area by driving the shape detection sensor while performing the high speed flight or by driving the shape detection sensor while performing low speed flight by switching from the airplane mode to the VTOL mode.

13 Claims, 7 Drawing Sheets

(51) Int. Cl.
    *G05D 1/00*     (2006.01)
    *B64C 39/02*     (2006.01)
    *B64D 47/08*     (2006.01)
    *E02F 9/26*     (2006.01)
    *G05D 1/10*     (2006.01)
    *G06K 9/00*     (2006.01)
    *E02F 9/20*     (2006.01)

(52) U.S. Cl.
CPC ............ *E02F 9/262* (2013.01); *G05D 1/0011* (2013.01); *G05D 1/0027* (2013.01); *G05D 1/0094* (2013.01); *G05D 1/102* (2013.01); *G06K 9/00637* (2013.01); *B64C 2201/123* (2013.01); *E02F 9/205* (2013.01); *E02F 9/2054* (2013.01); *G05D 2201/0202* (2013.01)

(58) Field of Classification Search
CPC ................. G05D 1/0094; G05D 1/102; G05D 2201/0202; G05D 2201/0201; G05D 2201/0207; G06K 9/0063; G06K 9/00637; E02F 9/205; E02F 9/2054; E02F 9/261; E02F 9/262
See application file for complete search history.

(56) References Cited

U.S. PATENT DOCUMENTS

2015/0261217 A1* 9/2015 Gil ..................... G05D 1/0038
    701/2
2016/0231750 A1* 8/2016 Kawamata ............. G06Q 50/02

OTHER PUBLICATIONS

Peter Odrich: "Drohnen and Roboter-Bagger Ersetzen Bauarbeiter" URL:http://www.ingenieur.de/Fachbereiche/Automation/Drohnen-Roboter-Bagger-ersetzen-Bauarbeiter, Feb. 2, 2015.
S. Siebert et al., Mobile 3D Mapping for Surveying Earthwork Projects Using an Unmanned Aerial Vehicle (UAV) System. Automation in Construction, vol. 41, pp. 1-14, 2014.
J. Teizer, "Status Quo and Open Challenges in Vision-Based Sensing and Tracking of Temporary Resources on Infrastructure Construction Sites." Advanced Engineering Informatics, vol. 29, pp. 225-238, 2015.
R.A. Carter, "Exploring the Dimensions of Digital Solutions in Mine Mapping." E&MJ, pp. 40-43, Jan. 2013.
X. Liu et al., "UAV-Based Low-Altitude Aerial Photogrammetric Application in Mine Areas Measurement." 2012 International Workshop on Earth Observation and Remote Sensing Applications.
European Search Report for corresponding European Application No. 15186256,2 dated Nov. 16, 2016.

* cited by examiner

SITE MANAGEMENT SYSTEM, IN-FLIGHT DETECTION METHOD, AND NON-TRANSITORY COMPUTER READABLE MEDIUM STORING PROGRAM OF SITE MANAGEMENT SYSTEM

CROSS-REFERENCE TO RELATED APPLICATION

The present application is based on and claims priority to Japanese patent application No. 2015-131668, filed Jun. 30, 2015, the disclosure of which is hereby incorporated by reference herein in its entirety.

BACKGROUND

Technical Field

The present invention relates to a site management system, in-flight detection method, and a non-transitory computer readable medium storing program for observing the shape of a civil construction site or the like.

Description of Related Art

In a civil construction site, it is necessary to confirm that the shape, size, height position, and so on of an executed place (so-called finished work) conform to the design.

Therefore, in a civil construction site, a measurement apparatus or the like to perform the measurement (so-called finished work measurement) of an executed place has been taught by, for example, JP2009-229222A. In this conventional technique, a measurement apparatus or the like is carried in an executed place to check whether the shape, size, height position, and so on of the executed place conform to the design.

SUMMARY

In a civil construction site, it is preferable to measure or detect the shape, size, height position, and so on of an executed place since the working accuracy in the executed place may affect the working accuracy in other places to be worked. However, since various types of working vehicles are used to execute the work in a civil construction sites, it is difficult for an operator to be in the vicinity of the executed place and to measure the shape, etc. using a measurement device each time the work is executed. Therefore, in the civil construction site, the work of the working vehicles has to be interrupted for measuring the shape, etc., or the measurement is not carried out every time the work is completed but is carried out when several works are completed. As a result, it is difficult to execute the works efficiently.

An object of the present invention is, therefore, to provide a site management system that can perform measurement safely even in the vicinity of the working vehicles.

To achieve the above object, an aspect of the present invention provides a site managing system including an unmanned airplane being switchable between an airplane mode for high speed flight and a VTOL mode for low speed flight, a working vehicle working in a civil construction site, a shape detection sensor provided in the unmanned airplane to detect a shape of the civil construction site, and an external control apparatus that controls flight of the unmanned airplane, driving of the working vehicle, and driving of the shape detection sensor. The external control apparatus moves the unmanned airplane to an observation area by performing the high speed flight. Further, the external control apparatus detects a shape of the observation area by driving the shape detection sensor while performing the high speed flight or by driving the shape detection sensor while performing low speed flight by switching from the airplane mode to the VTOL mode.

DETAILED DESCRIPTION

Hereinafter, embodiments of a site management system, an in-flight detection method, and a non-transitory computer readable medium storing program according to the invention will be described below with reference to the drawings.

Example 1

Figure 1:
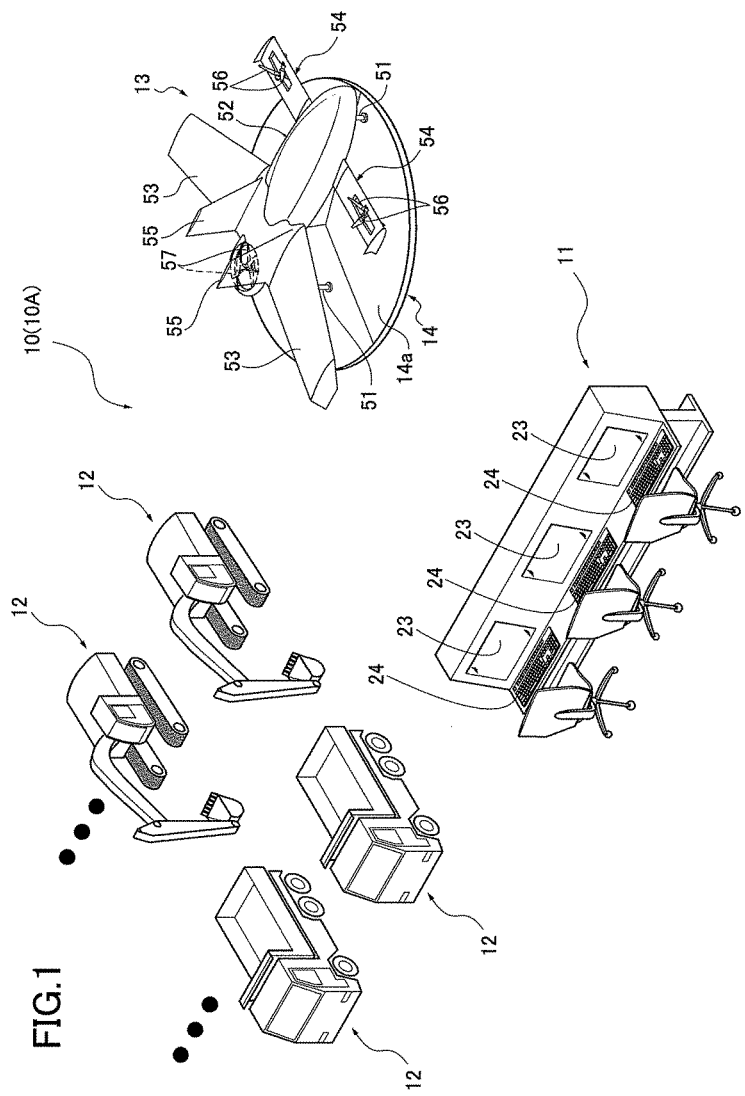
FIG. 1 is a perspective view schematically showing the structure of a site management system according to a first embodiment as an example of a site management system of the present invention.
Figure 4:
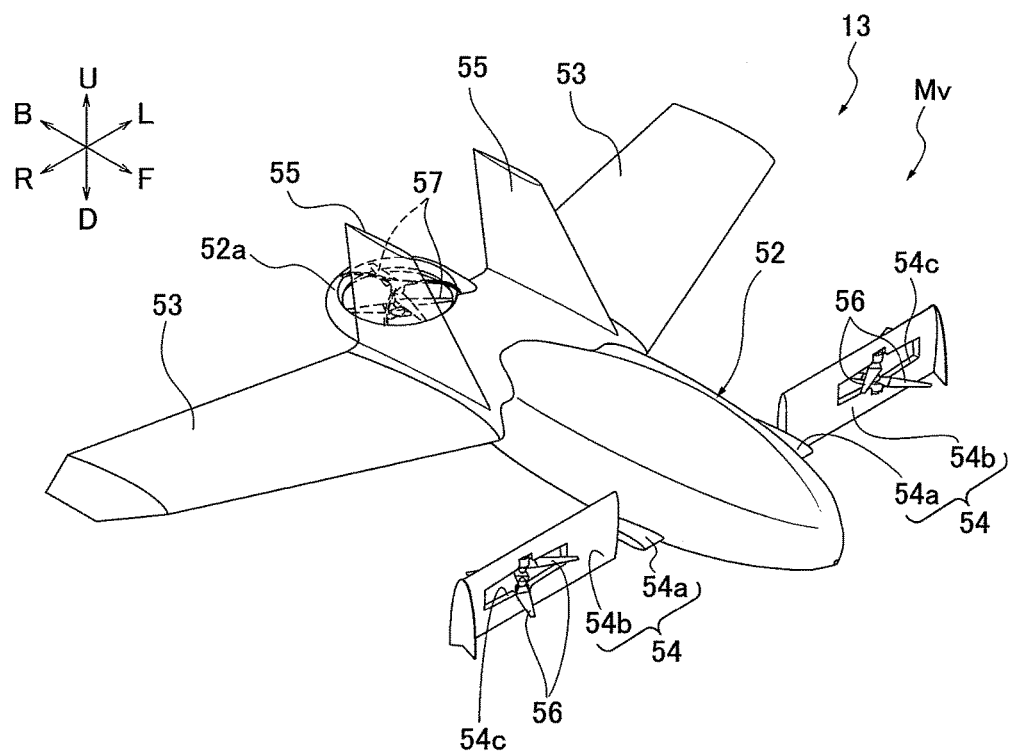
FIG. 4 is an explanatory view, similar to FIG. 3, for explaining the unmanned airplane in a VTOL mode Mv.
Figure 5:
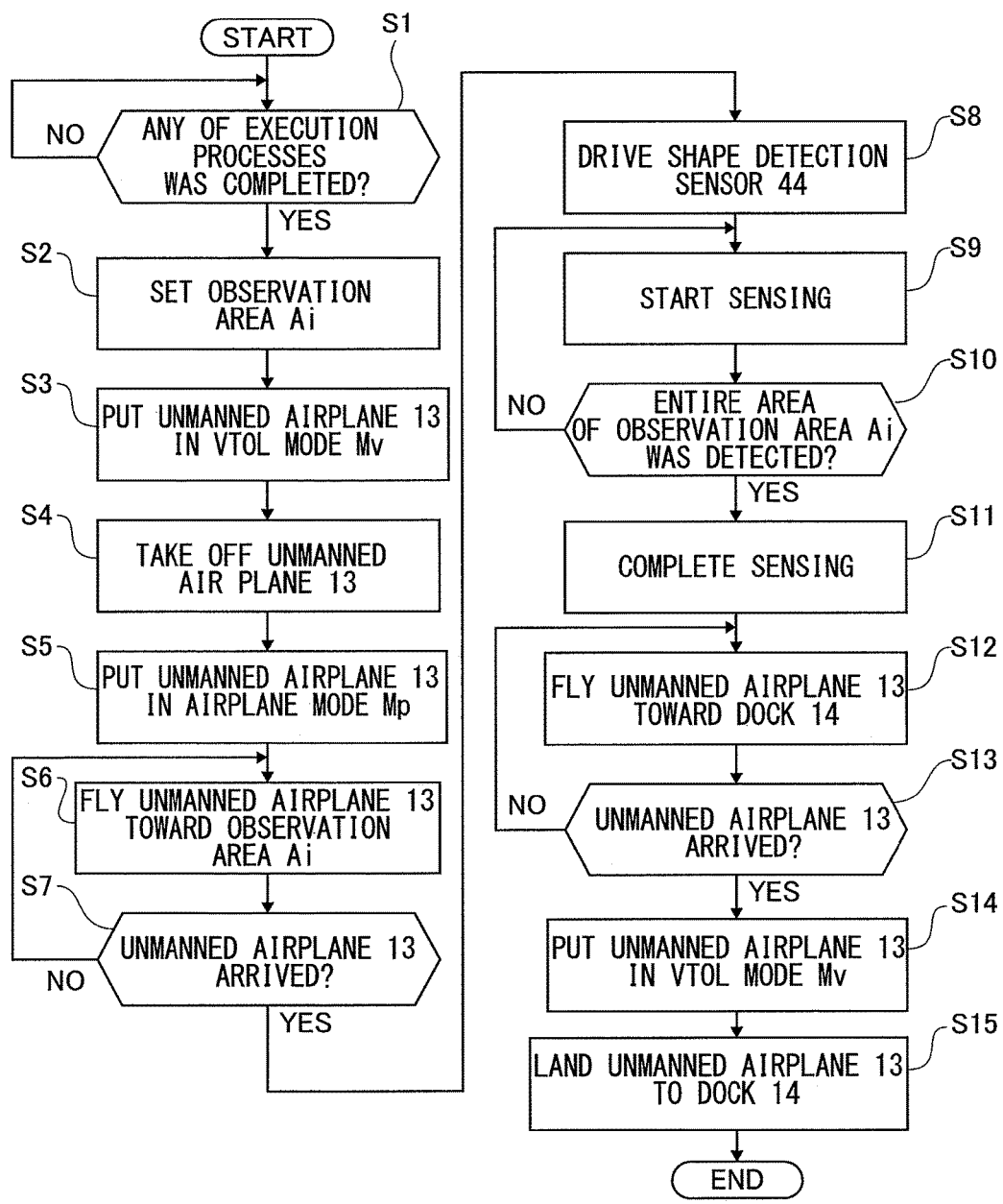
FIG. 5 is a flowchart showing an example of in-flight detection processing executed by an integrated control unit 21.
Figure 6:
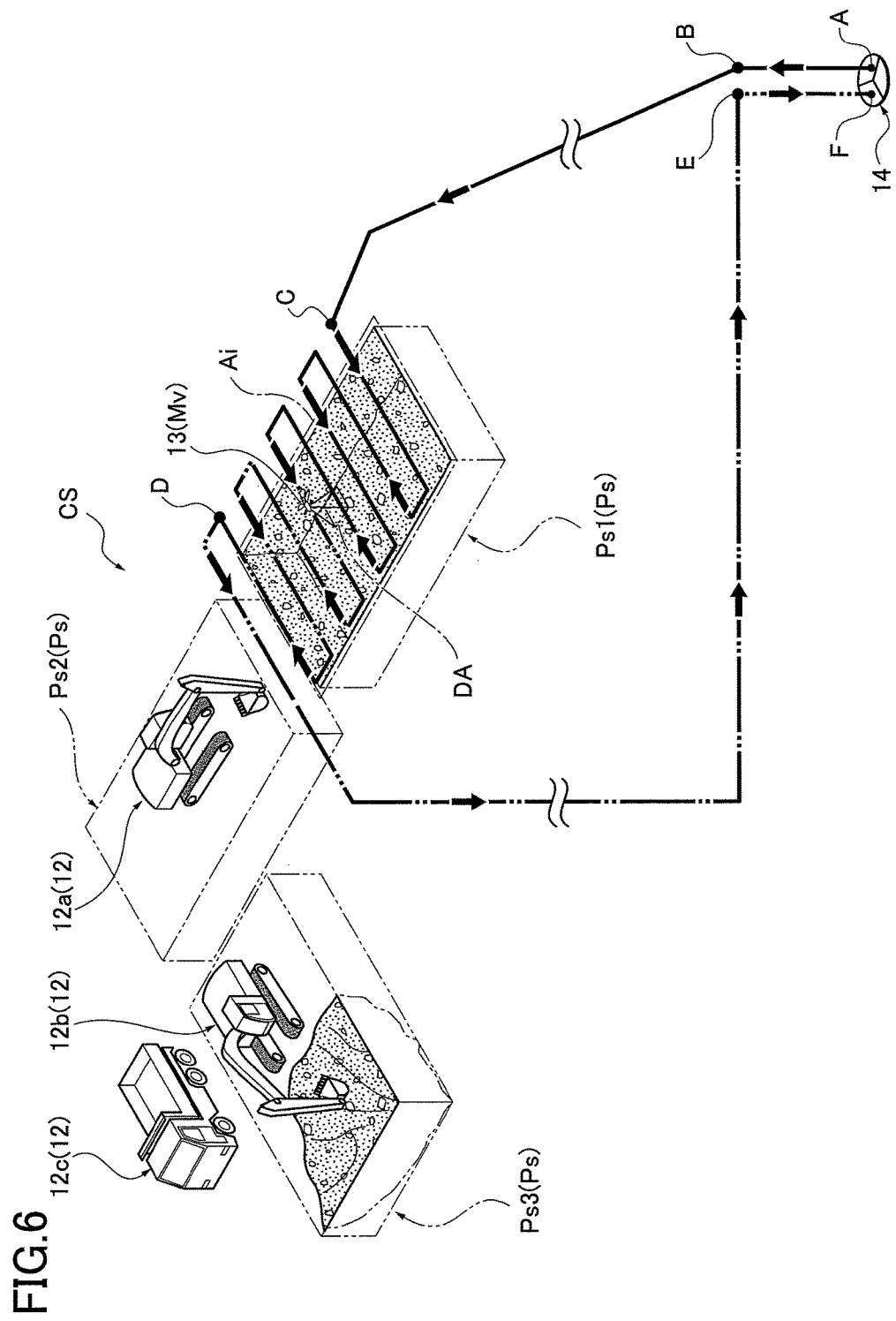
FIG. 6 is a diagram used to describe how the unmanned airplane detects the shape of an observation area (first working place) which has been executed in an working process assigned to working vehicles.

First, the structure of a site management system 10 according to a first embodiment of a site management system of the present invention will be schematically described with reference to FIGS. 1 to 6. The site management system 10 performs an in-flight detection method as an embodiment of the site management system according to the invention and includes a program as an embodiment of a program according to the invention. Note that FIG. 1 is shown schematically to facilitate the understanding of the structure of the site management system 10 and the aspects and relative sizes of components do not necessarily match actual aspects. In addition, FIG. 6 schematically shows an example of how an unmanned airplane 13 detects the shape of an observation area Ai (the first working place Ps1 thereof) and this does not necessarily comply with actual aspect.

The site management system 10 according to the first embodiment of the invention includes an external control apparatus 11, a plurality of working vehicles 12, the unmanned airplane 13, and a dock 14, as shown in FIG. 1. Under the control of the external control apparatus 11, the site management system 10 performs various types of work in working processes by driving the plurality of working vehicles 12 in a civil construction site CS (see FIG. 6 and so on) and detects the shape of the observation area Ai in the civil construction site CS by flying the unmanned airplane 13 while driving a shape detection sensor 44. The working processes are created by separating the work in the civil construction site CS by the work content and necessary time into a plurality of stages. The working processes do not necessarily need to be separated only by a difference in the work content and a plurality of work contents may be combined. For example, work for digging a single hole may be a single working process or a plurality of working processes, and work for destroying a hill and creating a bank may be a single working process or a plurality of working processes.

Figure 2:
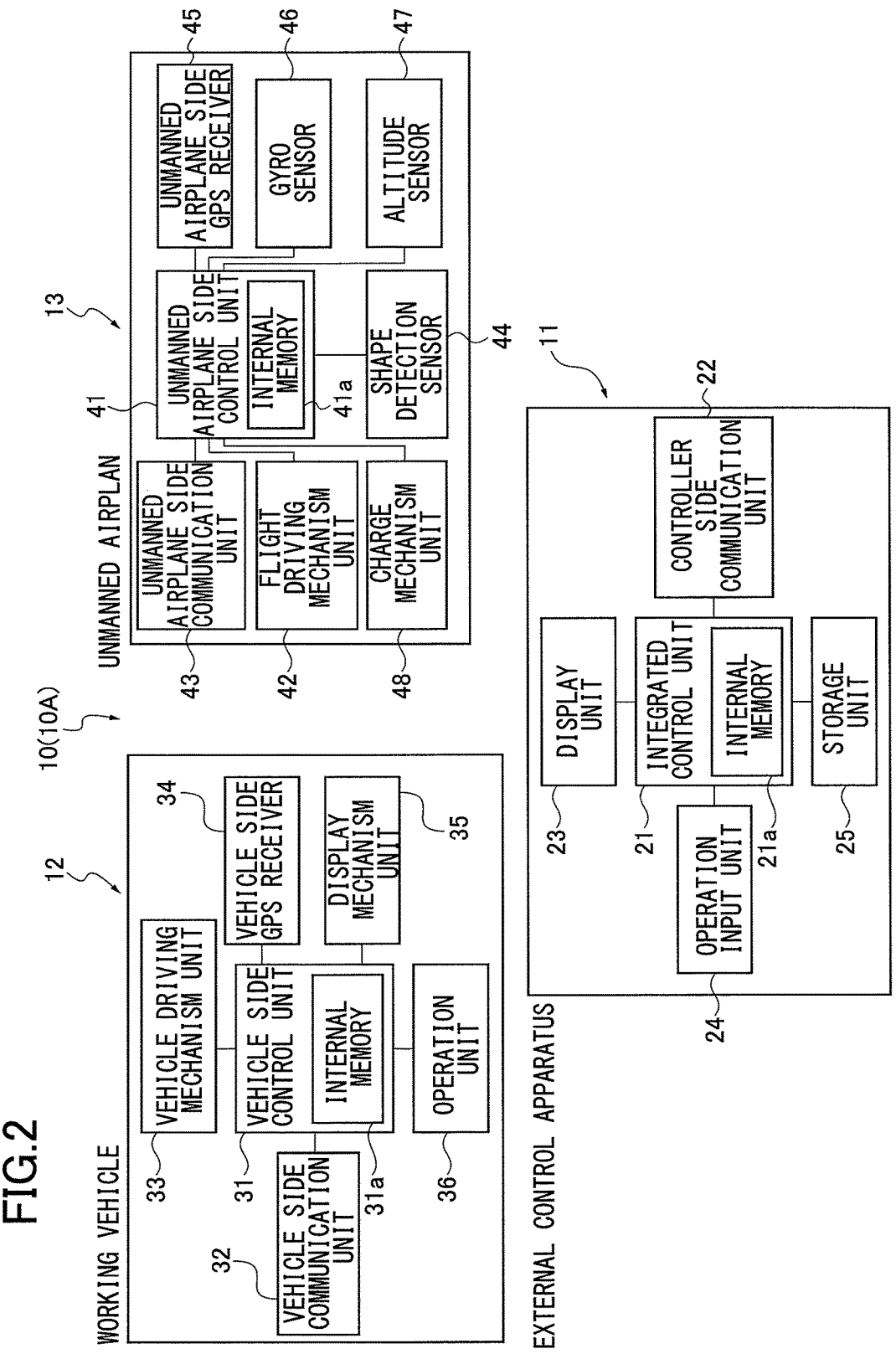
FIG. 2 is a block diagram schematically showing the functional structure of the site management system.

The external control apparatus 11 drives a plurality of working vehicles 12 as appropriate to perform various types of work in working processes set for the civil construction site CS. In addition, the external control apparatus 11 controls the operation of the unmanned airplane 13 based on a set flight program or an operation performed on an operation input unit 24. In addition, the external control apparatus 11 stores a detection result (the data thereof) transmitted from the unmanned airplane 13 (the shape detection sensor 44 thereof) in a storage unit 25 as appropriate and displays the detection result in a display unit 23 as appropriate. The external control apparatus 11 includes an integrated control unit 21, a control side communication unit 22, the display unit 23, the operation input unit 24, and the storage unit 25, as shown in FIG. 2. In the first embodiment, the external control apparatus 11 includes a plurality of computers having the storage unit 25 in which a program is stored. The program may be stored in an internal memory 21a of the integrated control unit 21.

The integrated control unit 21 performs the following processes using the program stored in the storage unit 25 or the built-in internal memory 21a in a centralized manner. The processes include setting processing and driving processing based on an operation performed on the operation input unit 24 and a communication processing between the control side communication unit 22 and a vehicle side communication unit 32 of the working vehicles 12 and between the control side communication unit 22 and an unmanned airplane side communication unit 43 of the unmanned airplane 13. In addition, the processes include work driving processing for driving the working vehicles 12 as appropriate to perform various types of work in set working processes and information obtainment processing for obtaining information of the working place Ps (see FIG. 6 and so on) for which execution has been completed in the working process. In addition, the processes include processing for setting the observation area Ai (see FIG. 6 and so on) in the civil construction site CS and drive control processing for the display unit 23. In addition, the processes include in-flight detection processing (see the flowchart in FIG. 5) by the unmanned airplane 13 and processing for storing a detection result (the data thereof) transmitted from the unmanned airplane 13 (the shape detection sensor 44 thereof) in the storage unit 25. The integrated control unit 21 executes the above operation (control) based on an operation performed on the operation input unit 24 or according to a program stored in the storage unit 25 (the internal memory 21a).

The control side communication unit 22 enables various types of signals (the data thereof) to be communicated via the vehicle side communication unit 32 or the unmanned airplane side communication unit 43 among the integrated control unit 21, a vehicle side control unit 31 of the working vehicles 12, and an unmanned airplane side control unit 41 of the unmanned airplane 13. The various types of signals include signals of operation (control) according to a program, signals based on operations performed on the operation input unit 24, signals accompanying various type of operation and actuation from the working vehicles 12, signals indicating the detection result of the shape detection sensor 44, and so on.

The display unit 23 includes a plurality of liquid crystal displays (see FIG. 1) and, under the control of the integrated control unit 21, displays information of the civil construction site CS and working processes, information of the working vehicles 12, a flight plan of the unmanned airplane 13, a detection result of the shape detection sensor 44 and so on.

The operation input unit 24 is used for setting the civil construction site CS and performing working processes. Further, the operation input unit 24 is used for performing and setting various types of operation of the external control apparatus 11, the working vehicles 12, or the unmanned airplane 13. This operation input unit 24 in the first embodiment includes a keyboard and a pointing device such as a mouse that are connected to a computer. The operation input unit 24 may include the display unit 23 having the function of a touch panel.

The storage unit 25 can store various types of data and programs and enables them to be read under the control of the integrated control unit 21. This storage unit 25 in the first embodiment stores (saves) a program for configuring the site management system 10 by combining the external control apparatus 11 with the working vehicles 12 and the unmanned airplane 13 and stores (saves) a detection result as appropriate output from the unmanned airplane 13. The storage unit 25 also stores (saves) information of the civil construction site CS and information of working processes in the civil construction site CS and stores (saves) programs for driving the working vehicles 12 and the unmanned airplane 13.

The working vehicles 12 are vehicles that perform working processes (various types of work in the civil construction site CS) set in the civil construction site CS. The working vehicle 12 is, for example, an excavator, earthmover, dump truck, mobile crane, and so on. In FIGS. 1, 6, and so on, an excavator (see reference symbols 12a and 12b in FIG. 6 and so on) and a dump truck (see reference symbol 12c in FIG. 6 and so on) are shown as examples. The site management system 10 includes at least one working vehicle 12 and normally includes a plurality of working vehicles 12 because various vehicles are normally used for various types of work content in the civil construction site CS. Since the working vehicle 12 has the same structure except that the structure of a vehicle driving mechanism unit 33 the driving signals, and the control content differ depending on the vehicle type, only the functional structure of a single working vehicle 12 is shown in FIG. 2.

The working vehicle 12 includes, as shown in FIG. 2, the vehicle side control unit 31, the vehicle side communication unit 32, the vehicle driving mechanism unit 33, a vehicle side GPS receiver 34, a display mechanism unit 35, and an operation unit 36. The vehicle driving mechanism unit 33 is driven to travel the working vehicle 12 or operate the working vehicle 12 variously depending on the types of movement and the vehicle. The vehicle driving mechanism unit 33 includes an engine for driving drive wheels and a steering unit for directional steering regardless of the vehicle type. In addition, the vehicle driving mechanism unit 33 has a driving unit for moving an arm when the working vehicle 12 is, for example, an excavator or has a driving unit for moving the blade and bucket when the working vehicle 12 is an earthmover. In addition, the vehicle driving mechanism unit 33 has a driving unit for moving the bed when the working vehicle 12 is, for example, a dump truck or has a driving unit for moving the crane when the working vehicle 12 is a mobile crane.

The vehicle side control unit 31 performs communication processing in the vehicle side communication unit 32 according to a program stored in a built-in internal memory 31a and performs driving processing for the vehicle driving mechanism unit 33 and the display mechanism unit 35 in a centralized manner. The vehicle side control unit 31 travels the working vehicle 12 or operates the working vehicle 12 variously by driving the vehicle driving mechanism unit 33 based on an operation signal from the integrated control unit 21 or an operation performed on the operation unit 36. In the first embodiment, the vehicle side control unit 31 appropriately and efficiently operates the working vehicles 12 depending on the types of the working vehicles 12 by automatically driving the vehicle driving mechanism unit 33. Such operation is enabled by obtaining the operation method (the information thereof) of experienced operators, analyzing it, and performing programming based on the analysis result. Since an experienced operator achieves good finishing while saving fuel consumption, appropriate and efficient work can be achieved by analyzing and applying the operation method (information) of the experienced operators. In such a structure, a plurality of working vehicles 12 of the same type can perform the same work, thereby improving the entire work efficiency of the civil construction site CS.

The vehicle side communication unit 32 enables various types of signals (the data thereof) to be communicated via the control side communication unit 22 between the integrated control unit 21 of the external control apparatus 11 and the vehicle side control unit 31. The various types of signals include signals of operation (control) according to a program from the external control apparatus 11, signals based on operations performed on the operation input unit 24 or the working vehicles 12 (the operation units 36 thereof), signals indicating the operation in the vehicle driving mechanism unit 33, or position measurement data (the signals thereof) obtained by the vehicle side GPS receiver 34. Accordingly, when an operation for completion of the working process is performed on the operation unit 36, the external control apparatus 11 (the integrated control unit 21 thereof) can obtain completion (the information thereof) of the working process and can obtain the work state (the information thereof) from the working vehicles 12 based on the operation of the vehicle driving mechanism unit 33. Accordingly, the external control apparatus 11 (the integrated control unit 21 thereof) can obtain work progress information from the working vehicles 12.

The vehicle side GPS receiver 34 is used to perform position measurement, for example, in the real-time kinematic (RTK) method using GNSS. The vehicle side GPS receiver 34 receives a radio wave from the GNSS orbiting satellites (GPS satellites) and extracts the data (position measurement data) necessary for position measurement transmitted with the radio wave. Although there are various methods in position measurement using the position measurement data, the methods are not described in detail because they are known conventionally. Position measurement using the position measurement data may be performed by the vehicle side control unit 31, may be performed by the integrated control unit 21 of the external control apparatus 11, or may be performed by an external device. The position measurement (the data thereof) is used to determine the coordinate position in which the working vehicle 12 travels or to determine the coordinate position of the point at which the vehicle driving mechanism unit 33 works.

The display mechanism unit 35 includes a liquid crystal display provided in the driver seat (steering seat) of the working vehicle 12 or a front glass provided in the driver seat (steering seat). The display mechanism unit 35 displays, under the control of the vehicle side control unit 31, various types of settings made by the operation unit 36 or the operation input unit 24 of the external control apparatus 11, information of the working vehicle 12 (the vehicle driving mechanism unit 33 thereof), and information of the civil construction site CS and the working processes. The information of the working processes includes the work content, procedure, place, and so on in the process. In the first embodiment, on the front glass as the display mechanism unit 35, information of the ongoing operation and information of the next work in each working process are superimposed on the scene seen through the front glass. For example, when the working vehicle 12 is an excavator and digs a hole, the information of operation is the shape of the hole to be dug (that is, the position and depth of the hole to be dug). Such information of operation can be displayed by using, for example, the augmented reality technology. Accordingly, the driver (operator) of the working vehicle 12 can perform the necessary work (working process) only by operating the working vehicles 12 according to information displayed on the front glass as the display mechanism unit 35.

The operation unit 36 is manipulated by the driver (operator) to travel the working vehicles 12 or operate the working vehicles 12 variously depending on the vehicle type. The operation unit 36 is also manipulated to transmit a signal indicating completion of an working process or a signal requesting information of another working process, and so on to the integrated control unit 21 of the external control apparatus 11 via the vehicle side communication unit 32 and the control side communication unit 22. The unmanned airplane 13 is used to check the state of execution by the working vehicle 12.

The unmanned airplane 13 includes the unmanned airplane side control unit 41, a flight driving mechanism unit 42, the unmanned airplane side communication unit 43, the shape detection sensor 44, an unmanned airplane side GPS receiver 45, a gyro sensor 46, an altitude sensor 47, and a charge mechanism unit 48. The flight driving mechanism unit 42 is driven to fly the unmanned airplane 13 and includes both movable front wings 54 the first propellers 56, and the second propellers 57.

The unmanned airplane side control unit 41 flies the unmanned airplane 13 by driving the flight driving mechanism unit 42 appropriately while using the detection results from the unmanned airplane side GPS receiver 45, the gyro sensor 46, and the altitude sensor 47. In addition, the unmanned airplane side control unit 41 executes communication processing in the unmanned airplane side communication unit 43 according to a program stored in a built-in internal memory 41a and drives the flight driving mechanism unit 42 and the shape detection sensor 44 based on a control signal from the integrated control unit 21 in a centralized manner.

The unmanned airplane side communication unit 43 enables various types of signals (the data thereof) to be communicated via the control side communication unit 22 with the integrated control unit 21 of the external control apparatus 11. The various types of signals include signals of operations (controls) according to a program from the external control apparatus 11, signals based on operations performed on the operation input unit 24, or signals indicating the detection result of the shape detection sensor 44.

The shape detection sensor 44 detects the shape of the civil construction site CS (see FIG. 6 and so on). As the shape detection sensor 44 for detecting the shape of the civil construction site CS, there are, for example, a hyper-spectrum camera, imaging device, laser scanning device, and so on. The hyper-spectrum camera, for example, obtains an image having a wavelength band from near-ultraviolet (for example, 350 nm) to near-infrared (for example, 1100 nm) and spectrally separates the image at predetermined intervals (for example, 5 nm) using a diffraction grating or the like to obtain hyper spectrum information. This hyper spectrum information is analyzed to obtain, for example, the type of a soil, the amount of water included, and so on in addition to the shape. When using the hyper-spectrum camera, since the amount of hyper spectrum information is enormous and can be used for various purposes depending on the analysis, the hyper spectrum information is preferably output to the external control apparatus 11 (the integrated control unit 21) as the detection result from the shape detection sensor 44.

An example of the imaging device is a general still camera, a video camera having a video recording function, a stereoscopic camera capable of obtaining a three-dimensional image using parallax, or a 360 degree camera capable of obtaining a 360 degree image. An example of the laser scanning device irradiates one point on the civil construction site CS with laser light and measures the angle of irradiation and the time (flight time) for the laser light to be returned as the reflected light. Since this laser scanning device can obtain the three-dimensional coordinates at that point based on the angle of irradiation and the flight time of the laser light, the three-dimensional shape of the civil construction site CS can be obtained by scanning on the civil construction site CS while moving the position of point irradiation.

The shape detection sensor 44 configured in this way may be formed as one or a plurality of the above sensors or other sensors. Although not shown in the drawing, the shape detection sensor 44 is provided in a main body 52 (see FIG. 3 and so on) of the unmanned airplane 13 and forms a detection area (see reference symbol DA in FIG. 6 and so on) in the civil construction site CS present below the main body 52. When the plurality of sensors described above are used together, a single duplicate detection area (see reference symbol DA in FIG. 6, and so on) may be formed or a separate detection area may be formed for each of the sensors so as to be superimposed during analysis. The detection results from such shape detection sensor 44 are used together with the position measurement result from the unmanned airplane side GPS receiver 45.

The unmanned airplane side GPS receiver 45 is used to perform position measurement, for example, in the real-time kinematic (RTK) method using GNSS as the vehicle side GPS receiver 34. The unmanned airplane side GPS receiver 45 receives radio waves from the GNSS orbiting satellites (GPS satellites) and extracts the data (position measurement data) necessary for position measurement transmitted with the radio wave. Position measurement using position measurement data is performed basically by the unmanned airplane side control unit 41, but the measurement may be performed by the integrated control unit 21 of the external control apparatus 11 or an external device for more accurate position measurement. The position measurement (the data thereof) is used to determine the coordinate position in which the unmanned airplane 13 flies or to add the coordinate position (the data thereof) to the detection result from the shape detection sensor 44. Although the unmanned airplane side GPS receiver 45 performs position measurement using the RTK method in the unmanned airplane 13 in the first embodiment, it is sufficient to ensure the accuracy for enabling the flight of the unmanned airplane 13 as a GPS receiver used for an air control circuit and the structure is not limited to that in the first embodiment. In this case, when the accuracy of the coordinate position (the data thereof) of a detection results from the shape detection sensor 44 is improved, it is preferable to provide a GPS receiver that enables position measurement at extremely high accuracy as the unmanned airplane side GPS receiver 45 in the first embodiment separately from the GPS receiver used for air control circuit.

The gyro sensor 46 detects rotary motion generated on the unmanned airplane 13 and outputs the detected rotary motion to the unmanned airplane side control unit 41. The gyro sensor 46 is used by the unmanned airplane side control unit 41 to determine the flight attitude or the like of the unmanned airplane 13. The altitude sensor 47 detects the flight altitude (location) of the unmanned airplane 13 and outputs the detected altitude to the unmanned airplane side control unit 41. The altitude sensor 47 is used by the unmanned airplane side control unit 41 to determine the flight altitude of the unmanned airplane 13. As described above, the unmanned airplane side control unit 41, the unmanned airplane side GPS receiver 45, the gyro sensor 46, and the altitude sensor 47 constitute the air control circuit that drives the driving mechanism unit 42 as appropriate to control the flight route and attitude of the unmanned airplane 13 while flying the unmanned airplane 13. The unmanned airplane 13 may use an acceleration sensor together as the air control circuit. Since the unmanned airplane 13 according to the first embodiment includes the two air control circuits described above, safe flight is ensured if a trouble occurs in one of them.

The charge mechanism unit 48 obtains and stores the electric power for operating the components of the unmanned airplane 13. In the first embodiment, this charge mechanism unit 48 obtains electric power supplied from the dock 14 when the unmanned airplane 13 stays on the dock 14 (see FIG. 1). The charge mechanism unit 48 may obtain electric power from a power point (socket) of a building, an electric generator, or another place as long as the charge mechanism unit 48 obtains and stores electric power for operating the components of the unmanned airplane 13, and its structure is not limited to that in the first embodiment.

The dock 14 is a place at which the unmanned airplane 13 stops as shown in FIG. 1. In the first embodiment, the dock 14 can supply electric power to the unmanned airplane 13 (the charge mechanism unit 48 thereof) that stops. The dock 14, which is disc-shaped, has an upper surface 14a on which feet 51 of the unmanned airplane 13 are disposed. Electric power is supplied to the charge mechanism unit 48 of the unmanned airplane 13 through the feet 51. The feet 51 are provided on the main body 52 and both main wings 53 of the unmanned airplane 13 and can be ejected downward (see FIG. 1) and can be accommodated in the main body 52 and both the main wings 53 (see FIGS. 3 and 4).

The site management system 10 according to the first embodiment uses a 360 degree camera and the laser scanning device as the shape detection sensor 44 provided in the unmanned airplane 13. In the site management system 10, when the unmanned airplane 13 is flying, a detection area DA (see FIG. 6 and so on) irradiated by laser light (an irradiation point) from the laser scanning device is defined below the unmanned airplane 13 (main body 52). Then, the site management system 10 can obtain the image of the civil construction site CS including information of a stereoscopic shape represented by a three-dimensional coordinate position by combining position measurement results from the unmanned airplane side GPS receiver 45 while matching an image by the 360 degree camera with the data of a point set by the laser scanning device. Accordingly, the site management system 10 can obtain the image and three-dimensional position information at very high accuracy based on detection results from the shape detection sensor 44.

Figure 3:
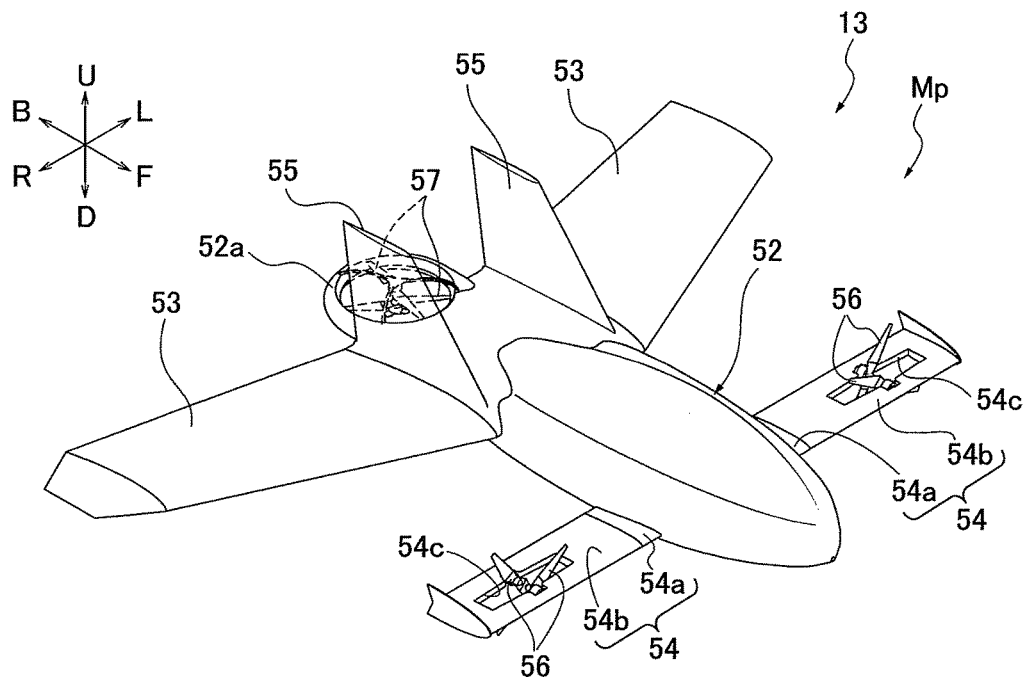
FIG. 3 is an explanatory view for explaining an unmanned airplane in an airplane mode Mp of the site management system.

Next, the outer structure of the unmanned airplane 13 will be described with reference to FIGS. 3 and 4. In the following description, as shown in FIGS. 3 and 4, it is assumed that the vertical direction when the unmanned airplane 13 is disposed on a horizontal surface is the up-down direction (see arrows U and D (arrow U is oriented upward)). It is also assumed that, in the following description, in the unmanned airplane 13 in that state, the direction along the horizontal surface in which the main body 52 extends is the front-rear direction (see arrows F and B (arrow F is oriented forward)) and the direction orthogonal to the up-down direction and the front-rear direction is the left-right direction (see arrows L and R (arrow R is oriented rightward)).

The main body 52 of the unmanned airplane 13 has the pair of main wings 53, the pair of movable front wings 54, and a pair of vertical tails 55 are provided. The main body 52 accommodates the unmanned airplane side control unit 41, the unmanned airplane side communication unit 43, the shape detection sensor 44, the unmanned airplane side GPS receiver 45, the gyro sensor 46, the altitude sensor 47, and the charge mechanism unit 48 (see FIG. 2) described above and has a streamline extending in the front-rear direction. At the rear end of the main body 52, the second propellers 57 are provided.

The main wings 53 produce a main lift force for the unmanned airplane 13 and are disposed in the vicinity of the rear end of the main body 52 as a pair. Both the main wings 53 project obliquely backward in the left-right direction from both sides of the main body 52 and the cross sections orthogonal to the left-right direction are like streamline thin plates. Both the main wings 53 have a width in the front-rear direction gradually reducing toward their ends (projection ends) and the projection end portions are returned obliquely downward.

The movable front wings 54 are provided in the vicinity of the front end of the main body 52 as a pair in front of both the main wings 53 of the main body 52. Both the movable front wings 54 project in the left-right direction from both sides of the main body 52 and the cross sections orthogonal to the left-right direction are like streamline thin plates. Both the movable front wings 54 each include a fixed wing part 54a fixed to the main body 52 and a rotary wing part 54b disposed rotatably about a rotary shaft extending in the horizontal direction from the fixed wing part 54a. In both the movable front wings 54, by turning the rotary wing parts 54b relative to the fixed wing parts 54a, the rotary wing parts 54b can be laid down (see FIG. 3) and the rotary wing parts 54b can be stood up (see FIG. 4). When the rotary wing parts 54b of both the movable front wings 54 are laid down, integral thin plates are formed from the fixed wing parts 54a to the rotary wing parts 54b and a single wing (horizontal wind) is formed as a whole (see FIG. 3). The first propellers 56 are provided in each of the rotary wing parts 54b.

The vertical tails 55 are provided in the vicinity of the rear end of the main body 52 as a pair in the positions substantially the same as those of the main wings 53 in the front-rear direction. Both the vertical tails 55 project obliquely backward in the up-down direction from the vicinity of both sides of the main body 52 and the cross sections orthogonal to the up-down direction are like streamline thin plates.

When the rotary wing parts 54b of both the movable front wings 54 are laid down to form an integral thin plate from the fixed wing parts 54a to the rotary wing parts 54b in the unmanned airplane 13 (see FIG. 3), both the movable front wings 54, both the main wings 53, and both the vertical tails 55 form wings to enable gliding. The unmanned airplane 13 has the first propellers 56 and the second propellers 57 as the flight driving mechanism unit 42 for obtaining a thrust force.

The first propellers 56 are provided in the rotary wing part 54b of each of the movable front wings 54 as a pair in the front-rear direction. That is, the two first propellers 56 are provided for each of the movable front wings 54 (the rotary wing parts 54b thereof) and a total of four first propellers 56 are provided in the unmanned airplane 13. Each of the first propellers 56 is provided in a mount opening 54c of the rotary wing part 54b of each of the movable front wings 54. The mount opening 54c is provided so as to pass through the rotary wing part 54b in the up-down direction to form a rectangle in a state in which the rotary wing part 54b is laid down. The first propellers 56 are provided in the mount openings 54c rotatably about the rotary shaft extending in the front-rear direction in a state in which the rotary wing parts 54b are laid down. The first propellers 56 are provided in the same mount opening 54c as a pair in the front-rear direction and rotate in mutually opposite directions to cancel torques (forces rotating the main body 52 (the unmanned airplane 13)) each other produced by rotation.

When the rotary wing parts 54b are laid down, the first propellers 56 rotate about the rotary shaft extending in the front-rear direction to produce a thrust force in the front-rear direction (horizontal direction) (see FIG. 3). When the rotary wing parts 54b are stood up, the first propellers 56 rotate about the rotary shaft extending in the up-down direction to produce a thrust force mainly in the up-down direction (see FIG. 4). When the rotary wing parts 54b stood up are inclined forward, the rotary shaft oriented in the vertical direction is inclined forward, the first propellers 56 rotate about the rotary shaft to produce a thrust force to the front side in the front-rear direction in addition to the thrust force in the up-down direction. Similarly, when the rotary wing parts 54b stood up are inclined backward, the rotary shaft oriented in the up-down direction is inclined backward, the first propellers 56 rotate about the rotary shaft to produce a thrust force to the rear side in the front-rear direction in addition to the thrust force in the up-down direction.

The second propellers 57 are provided as a pair in the up-down direction in a circular mount opening 52a provided at the rear end of the main body 52. The circular mount opening 52a is like a circle about the center axis line extending in the up-down direction and is provided so as to project backward from the rear end of the main body 52. The second propellers 57 are provided in the circular mount opening 52a and rotate in mutually opposite directions about the rotary shaft extending in the up-down direction to cancel torques produced by rotation. The second propellers 57 produce a thrust force in the up-down direction by rotating about the rotary shaft extending in the up-down direction.

In the unmanned airplane 13, seen in the up-down direction, the center positions of both the first propellers 56 of one of the movable front wings 54 (rotary wing parts 54b), both the first propellers 56 of the other of the movable front wings 54 (rotary wing parts 54b), and both the second propellers 57 are disposed in the vertices of a substantially regular triangle. In the unmanned airplane 13 as configured above, gliding is enabled when the rotary wing parts 54b are laid down as shown in FIG. 3 and a thrust force in the front-rear direction can be produced by the first propellers 56, enabling flight as a propeller airplane. In a state in which the rotary wing parts 54b are laid down (referred to as the airplane mode Mp), the unmanned airplane 13 can fly efficiently at high speed.

When the rotary wing parts 54b are stood up in the unmanned airplane 13 as shown in FIG. 4, the first propellers 56 can produce a thrust force in the up-down direction, enabling elevating, lowering, and hovering in cooperation with the second propellers 57. When the rotary wing parts 54b stood up are inclined in the front-rear direction in the unmanned airplane 13, the first propellers 56 can produce a thrust force in the up-down direction and the front-rear direction. Accordingly, when the rotary wing parts 54b are stood up (referred to as a VTOL (Vertical Taking Off and Landing) mode Mv), the unmanned airplane 13 can perform vertical taking off and landing, hovering, and stable and low-speed flight like a helicopter. In the VTOL mode Mv, the first propellers 56 and the second propellers 57 function as rotors. Accordingly, in the unmanned airplane 13, the first propellers 56 function as propulsive units that can change their attitudes (output direction) relative to the main body 52. In addition, in the unmanned airplane 13, the movable front wings 54 in which the first propellers 56 are disposed function as movable wings provided on the main body 52 so as to change their attitudes.

In addition, the unmanned airplane 13 can define the detection area DA (see FIG. 6 and so on) therebelow during flight using the shape detection sensor 44 (see FIG. 2) provided on the main body 52 regardless of whether the unmanned airplane 13 is put in the airplane mode Mp or the VTOL mode Mv. Accordingly, the unmanned airplane 13 can detect the shape of the civil construction site CS in either mode by flying above the civil construction site CS. If the shape detection sensor 44 performs detection at constant time-intervals in the unmanned airplane 13, the intervals (resolution) of detection positions (distances between the detection positions) in the civil construction site CS depend on the flight speed. Accordingly, when the shape detection sensor 44 detects the shape of the civil construction site CS during low speed flight in the VTOL mode Mv, as compared with the case in which the shape detection sensor 44 detects the shape of the civil construction site CS during high speed flight in the airplane mode Mp, the shape can be detected in shorter time, thereby enabling detection of the state of the civil construction site CS more accurately.

Next, in-flight detection processing will be described with reference to FIG. 5. The in-flight detection processing detects the shape of the civil construction site CS using the unmanned airplane 13 under the control of the integrated control unit 21 of the external control apparatus 11 in the site management system 10. FIG. 5 is a flowchart showing the in-flight detection processing (in-flight detection method) executed by the integrated control unit 21 in the first embodiment. The in-flight detection processing is executed by the integrated control unit 21 based on a program stored in the internal memory 21a of the integrated control unit 21 or the storage unit 25. The flowchart in FIG. 5 is started by turning on the power to the unmanned airplane 13.

In step S1, a decision is made as to whether any of a plurality of working processes performed in the civil construction site CS is completed. In the first embodiment, when the working vehicle 12 (the vehicle side control unit 31 thereof) transmits a signal indicating that an operation indicating completion has been performed on the operation unit 36, it is determined that the working process assigned to the working vehicle 12 has been completed. The decision of completion of the working process may be made based on images and detection signals from imaging devices and various types of sensors provided in the working vehicles 12. In step S1, the decision is repeated until any working process is completed.

In step S2, following step S1 in which it is determined that any working process has been completed, the observation area Ai is set, and the processing proceeds to step S3. In step S2, information such as the position, shape, and size of the working place Ps executed by the completed working process is obtained and the observation area Ai is set so as to include the entire area of the working place Ps (see FIG. 6). The observation area Ai is the area in which the unmanned airplane 13 in the VTOL mode Mv detects the shape of the civil construction site CS using the shape detection sensor 44, that is, the area in the civil construction site CS observed using the unmanned airplane 13. The working place Ps is the place executed by the corresponding working process, that is, the place in which the working process works. Accordingly, in step S2, the observation area Ai is set to observe the place in which the completed working process worked using the unmanned airplane 13 and a flight plan of the unmanned airplane 13 for observing the observation area Ai is set. This flight plan indicates information such as a flight route in which the unmanned airplane 13 takes off the dock 14, reaches the observation area Ai, performs shape detection (sensing processing) on the observation area Ai using the unmanned airplane 13 in the VTOL mode Mv, and then returns to and lands on the dock 14. In the flight plan, the flight route is set so as to move the detection area DA for efficient detection of the entire area of the observation area Ai in sensing processing by considering the shapes and sizes of the observation area Ai and the detection area DA.

In step S3, following step S2 in which the observation area Ai is set, the unmanned airplane 13 is put in the VTOL mode Mv, and the processing proceeds to step S4. In step S3, the unmanned airplane 13 is put in the VTOL mode Mv (that is, the rotary wing parts 54b of both the movable front wings 54 are stood up) to fly the unmanned airplane 13 according to the obtained flight plan.

In step S4, following step S3 in which the unmanned airplane 13 is put in the VTOL mode Mv, the unmanned airplane 13 is taken off, and the processing proceeds to step S5. In step S4, the first propellers 56 and the second propellers 57 of the unmanned airplane 13 in the VTOL mode Mv are driven as appropriate to elevate the unmanned airplane 13.

In step S5, following step S4 in which the unmanned airplane 13 is taken off, the unmanned airplane 13 is put in the airplane mode Mp, and the processing proceeds to step S6. In step S5, the unmanned airplane 13 having taken off is put in the airplane mode Mp (that is, the rotary wing parts 54b of both the movable front wings 54 are laid down) to fly it to the observation area Ai set in step S2. At this time, the first propellers 56 and the second propellers 57 are driven as appropriate so that the unmanned airplane 13 hovers in the air.

In step S6, following step S5 in which the unmanned airplane 13 is put in the airplane mode Mp or step S7 in which it is determined that the unmanned airplane 13 has not reached the point, the unmanned airplane 13 starts or continues flight toward the observation area Ai, and the processing proceeds to step S7. In step S6, the driving of the first propellers 56 is mainly adjusted and the unmanned airplane 13 in the airplane mode Mp is flown to the first arrival point in the observation area Ai in the flight plan. The first arrival point is set from the viewpoint of efficient sensing of the observation area Ai and the viewpoint of efficient flight of the unmanned airplane 13 over the observation area Ai by considering the positional relationship between the dock 14 and the observation area Ai.

In step S7, following step S6 in which the unmanned airplane 13 starts flight toward the observation area Ai, a decision is made as to whether the unmanned airplane 13 has reached the point, and the processing proceeds to step S8 in the case of Yes or returns to step S6 in the case of No. In step S7, the decision is made as to whether the unmanned airplane 13 has reached the first arrival point in the observation area Ai in the flight plan and this decision is repeated while the unmanned airplane 13 continues flight until it reaches the first arrival point.

In step S8, following step S7 in which it is determined that the unmanned airplane 13 has reached the point, the shape detection sensor 44 is driven, and the processing proceeds to step S9. In step S8, since the unmanned airplane 13 has reached the observation area Ai, the shape detection sensor 44 is driven to detect the shape of the observation area Ai.

In step S9, following step S8 in which the shape detection sensor 44 is driven or step S10 in which it is determined that the entire area of the observation area Ai has not been detected, sensing is started or continued, and the processing proceeds to step S10. In step S9, the detection, that is, sensing (sensing processing) of the shape of the observation area Ai is started by flying the unmanned airplane 13 while driving the shape detection sensor 44 and defining the detection area DA (see FIG. 6 and so on) on the observation area Ai. In step S9, switching between high speed flight in the airplane mode Mp and low speed flight in the VTOL mode Mv is made as appropriate to perform sensing (sensing processing) of the observation area Ai. In the switching, for example, low speed flight in the VTOL mode Mv is used when the shape of the observation area Ai needs to be detected accurately and high speed flight in the airplane mode Mp is used when the shape of the observation area Ai does not need to be detected so accurately. The necessary detection accuracy can be set depending on, for example, the accuracy needed for the finished work and the complexity of the finished work based on the design of an working process to be targeted. In addition, the switching may be made as appropriate depending on the position (place) in the single observation area Ai or detection in the VTOL mode Mv may be performed depending on the detection result in the airplane mode Mp. "Depending on the detection result in the airplane mode Mp" means that, for example, if there is a point having a shape and position different from those assumed in detection in the airplane mode Mp, the point is detected more accurately in the VTOL mode Mv. In step S9, the detection area DA is moved to efficiently detect the entire area of the observation area Ai by flying the unmanned airplane 13 according to the flight route in the flight plan generated in step S2 for the observation area Ai. When detection in the VTOL mode Mv is performed according to the detection result in the VTOL mode Mv as described above, the flight plan (the flight route thereof) for the observation area Ai is updated. In step S9, the detection result of sensing is obtained from the shape detection sensor 44 via the unmanned airplane side communication unit 43 and the control side communication unit 22 and the detection result is stored in the internal memory 21a or the storage unit 25.

In step S10, following step S9 in which sensing is started, a decision is made as to whether the entire area of the observation area Ai is detected, and the processing proceeds to step S11 in the case of Yes or returns to step S9 in the case of No. In step S10, the decision is made as to whether the detection area DA has been defined over the entire area of the observation area Ai (that is, whether the shape of the entire area of the observation area Ai has been detected). In step S10, this decision is repeated while continuing sensing until the detection area DA is defined over the entire area of the observation area Ai (until the shape of the entire area is detected).

In step S11, following step S10 in which it is determined that the entire area of the observation area Ai has been detected, sensing is completed, and the processing proceeds to step S12. In step S11, since the entire area of the observation area Ai has been detected, the driving of the shape detection sensor 44 is stopped, the sensing is completed, and the flight mode of the unmanned airplane 13 is changed to return to the dock 14. In step S11, when sensing in the VTOL mode Mv is made during decision in step S10, the flight mode is changed to the airplane mode Mp (that is, the rotary wing parts 54b of both the movable front wings 54 are laid down). At this time, the first propellers 56 and the second propellers 57 are driven as appropriate so that the unmanned airplane 13 hovers in the air. Alternatively, in step S11, when sensing in the airplane mode Mp is made during decision in step S10, the airplane mode Mp is maintained.

In step S12, following step S11 in which sensing is completed or step S13 in which it is determined that the unmanned airplane 13 has not reached the point, the unmanned airplane 13 starts or continues flight toward the dock 14, and the processing proceeds to step S13. In step S12, the driving of the first propellers 56 is mainly adjusted and the unmanned airplane 13 in the airplane mode Mp is flown to the dock 14.

In step S13, following step S12 in which the unmanned airplane 13 starts flight toward the dock 14, a decision is made as to whether the unmanned airplane 13 has reached the point, and the processing proceeds to step S14 in the case of Yes or returns to step S12 in the case of No. In step S13, the decision is made as to whether the unmanned airplane 13 has reached the upward position (above the position in which the dock 14 is present) above the dock 14 and this decision is repeated while the unmanned airplane 13 continues flight until it reaches the upward position.

In step S14, following step S13 in which it is determined that the unmanned airplane 13 has reached the point, the unmanned airplane 13 is put in the VTOL mode Mv, and the processing proceeds to step S15. In step S14, since the unmanned airplane 13 has reached the upward position above the dock 14, the unmanned airplane 13 is put in the VTOL mode Mv (that is, the rotary wing parts 54b of both the movable front wings 54 are stood up) so as to land on the dock 14. At this time, the first propellers 56 and the second propellers 57 are driven as appropriate so that the unmanned airplane 13 hovers in the air.

In step S15, following step S14 in which the unmanned airplane 13 is put in the VTOL mode Mv, the unmanned airplane 13 is landed and the in-flight detection processing is completed. In step S15, the first propellers 56 and the second propellers 57 of the unmanned airplane 13 in the VTOL mode Mv are driven as appropriate, the feet 51 are extended while the unmanned airplane 13 is lowered, and the unmanned airplane 13 is landed on the dock 14 with the feet 51 placed on the upper surface 14a.

Next, operation during observation of the civil construction site CS using the unmanned airplane 13 of the site management system 10 according to the first embodiment will be described with reference to FIG. 6. In the example in FIG. 6, there are two excavators, one dump truck, and three working vehicles 12 in the civil construction site CS. In the example in FIG. 6, the working place Ps in the working process assigned to one excavator (referred to below as the working vehicle 12*a*) is assumed to be the first working place Ps1, and the working place Ps in the working process next assigned to the working vehicle 12*a* is assumed to be the second working place Ps2. In addition, in the example in FIG. 6, the working place Ps in the working process assigned to the other excavator (referred to below as the working vehicle 12*b*) is assumed to be the third working place Ps3. In addition, in the example in FIG. 6, each of the working processes digs a rectangular hole in a predetermined position in the civil construction site CS and the first working place Ps1, the second working place Ps2, and the third working place Ps3 are indicated by the hole shapes (rectangular parallelepiped shape). In the example in FIG. 6, the working vehicle 12*a* has completed the execution of the first working place Ps1 and is shifting to the execution of the second working place Ps2 while the working vehicle 12*b* is performing the execution of the third working place Ps3. In the example in FIG. 6, the dump truck (referred to below as a working vehicle 12*c*) is used to convey excavated material dug by the working vehicle 12*b*. In the example in FIG. 6, sensing in the VTOL mode Mv is carried out over the entire area of the observation area Ai.

First, in the site management system 10, the working vehicles 12 (12*a*, 12*b*, and 12*c*) are driven under the control of the external control apparatus 11 (the integrated control unit 21 thereof) as shown in FIG. 6 and the above working processes are performed in the civil construction site CS. In the site management system 10, the power to the unmanned airplane 13 is turned on to enable observation of the civil construction site CS using the unmanned airplane 13. Then, the site management system 10 waits for any of the working processes to be completed by repeating step S1 in the flowchart in FIG. 5. Accordingly, the unmanned airplane 13 stands-by on the dock 14 (see position A).

When the working process assigned to the working vehicle 12*a* is completed (i.e., when a rectangular parallelepiped hole in the first working place Ps1 has been formed), the working vehicle 12*a* (the operation unit 36 thereof) transmits a signal indicating completion of the working process to the external control apparatus 11 (the integrated control unit 21). Then, the processing proceeds to step S1 and then step S2 to obtain the position, shape, and size of the first working place Ps1 executed by the completed working process and set the observation area Ai so as to include the entire area of the first working place Ps1. Then, the processing proceeds to step S3 in the flowchart in FIG. 5 to put the unmanned airplane 13 in the VTOL mode Mv (see FIG. 4), and the processing proceeds to step S4 to take the unmanned airplane 13 off the dock 14 (see FIG. 1) vertically (see the route from position A to position B). After that, the processing proceeds to step S5 in the flowchart in FIG. 5 to put the unmanned airplane 13 in the airplane mode Mp (see FIG. 3), and the processing proceeds to step S6 and then step S7 to repeat the process and move the unmanned airplane 13 from a position above the dock 14 to the first arrival point (see the route from position B to position C) in the observation area Ai.

Then, the processing proceeds to step S8 in the flowchart in FIG. 5 to drive the shape detection sensor 44 of the unmanned airplane 13, and the processing proceeds to step S9 and then step S10 to put the unmanned airplane 13 in the VTOL mode Mv (see FIG. 4) and starts sensing the observation area Ai in the VTOL mode Mv (see position C). Then, the processing repeats step S9 and step S10 in the flowchart in FIG. 5 to perform sensing while moving the detection area DA by flying the unmanned airplane 13 in the VTOL mode Mv and efficiently detects the observation area Ai, that is, the entire area of the first working place Ps1 (see the route from position C to position D). Accordingly, the site management system 10 can detect the shape of the first working place Ps1 at the high resolution corresponding to sensing in the VTOL mode Mv executed by the working process for which a signal indicating completion has been received. Accordingly, the shape of the first working place Ps1 that has been executed can be detected accurately.

After that, the processing proceeds to step S11 in the flowchart in FIG. 5 to stop the driving of the shape detection sensor 44 and put the unmanned airplane 13 in the airplane mode Mp (see FIG. 3). Then, the processing proceeds to step S12 and then step S13 and repeats the process to move the unmanned airplane 13 from the observation area Ai (the first working place Ps1) to a position above the dock 14 (see the route from position D to position E). After that, the processing proceeds to step S14 in the flowchart in FIG. 5 to put the unmanned airplane 13 in the VTOL mode Mv (see FIG. 4), and the processing proceeds to step S15 to land the unmanned airplane 13 on the dock 14 vertically (see the route from position E to position F). Then, the site management system 10 supplies and charges electric power to the unmanned airplane 13 (the charge mechanism unit 48 thereof) via the feet 51 from the dock 14. After that, when the execution of the second working place Ps2 and the third working place Ps3 is completed, the unmanned airplane 13 performs sensing in the VTOL mode Mv by performing operation similar to the above operation to detect the shapes of the second working place Ps2 and the third working place Ps3.

As described above, when any of a plurality of working processes performed in the civil construction site CS is completed in the site management system 10, the unmanned airplane 13 is flown in the airplane mode Mp to the working place Ps executed by the completed working process. Then, the site management system 10 detects the shape of the working place Ps using sensing (sensing in the VTOL mode Mv in the example in FIG. 6) by the unmanned airplane 13 and then flies the unmanned airplane 13 to return in the airplane mode Mp. Accordingly, when any of a plurality of working processes is completed, the site management system 10 can immediately detect the shape of the working place Ps executed by the working process.

In the site management system 10 according to the first embodiment of the invention, the unmanned airplane 13 detects the shape of the working place Ps executed by the working process by flying above the working vehicles 12 that are working in the civil construction site CS. Accordingly, the site management system 10 prevents the unmanned airplane 13 for detecting the shape of the working place Ps from interfering with the work of the working vehicles 12 on the ground. Therefore, in the site management system 10, it is not necessary to interrupt the work of the working vehicles 12 in order to measure the executed place, thereby enabling efficient work. This is also effective when the working vehicles 12 have a system that can detect an approach of anyone and, upon detection, automatically terminate the work. Such a system can be configured by incorporating a sensor using a microwave, laser, or camera in the working vehicles 12.

In addition, in the site management system 10, if any of a plurality of working processes that are being executed is completed, the working place Ps executed by the completed working process is set as the observation area Ai, and the shape of the observation area Ai (working place Ps) is detected. Accordingly, the site management system 10 can immediately detect the shape of the working place Ps executed by the completed working process. Therefore, since it is possible to immediately detect whether the shape, size, height position, and so on of the working place Ps are executed at a desired accuracy, the working place Ps can be immediately corrected if it does not meet the desired accuracy, thereby preventing the accuracy of other executions (the places thereof) from being affected.

In addition, the site management system 10 performs sensing of the observation area Ai by flying the unmanned airplane 13 that has been moved to the observation area Ai (working place Ps) while driving the shape detection sensor 44. At this time, the site management system 10 performs sensing (sensing processing) of the observation area Ai by appropriately switching between the high speed flight in the airplane mode Mp and the low speed flight in the VTOL mode Mv. Accordingly, the site management system 10 can obtain the shape of the observation area Ai (working place Ps) at the requested resolution. In particular, the site management system 10 can obtain the shape at the resolution corresponding to sensing in the VTOL mode Mv by performing low speed flight in the VTOL mode Mv. Accordingly, the site management system 10 can obtain the shape of the observation area Ai (working place Ps) at the resolution requested in the civil construction site CS.

The site management system 10 moves the unmanned airplane 13 to the observation area Ai (working place Ps) in the airplane mode Mp, performs switching between the high speed flight in the airplane mode Mp and the low speed flight in the VTOL mode Mv appropriately, and performs sensing of the observation area Ai. Since the site management system 10 flies the unmanned airplane 13 to reach the observation area Ai (working place Ps) at high speed, even in the civil construction site CS ranging widely, it is possible to immediately detect the shape of the working place Ps executed the completed working process.

The site management system 10 detects the shape of the working place Ps using the unmanned airplane 13 in which switching between the high speed flight in the airplane mode Mp and the low speed flight in the VTOL mode Mv is enabled. Accordingly, the site management system 10 can immediately and efficiently detect the shape of the working place Ps that has been executed, at the accuracy requested in the civil construction site CS. This is because of the following reason. In an unmanned airplane allowed to fly only like a helicopter, a lift force and thrust force are produced by a rotor, so the speed cannot be increased easily and the fuel economy is not good. On the other hand, in an unmanned airplane allowed to fly only like an airplane, it is very difficult to detect the shape at the accuracy requested in the civil construction site CS. In the unmanned airplane 13 of the site management system 10, since the high speed flight is performed in the airplane mode Mp that allows gliding, a lift force produced on the airframe can be used. Accordingly, the fuel economy is good, the flight speed is high, and the flight distance and flight time can be increased. In addition, the unmanned airplane 13 of the site management system 10 can detect the shape at the accuracy requested in the civil construction site CS by performing sensing during low speed flight in the VTOL mode Mv.

In the site management system 10, switching of the unmanned airplane 13 between the high speed flight in the airplane mode Mp and the low speed flight in the VTOL mode Mv is performed by changing the attitudes of the first propellers 56 as propulsive units relative to the main body 52. This enables the site management system 10 to switch between the high speed flight in the airplane mode Mp and the low speed flight in the VTOL mode Mv with a simple structure.

The site management system 10 enables the first propellers 56 as propulsive units to change their attitudes relative to the main body 52 by mounting the first propellers 56 in the movable front wings 54 (movable wings) in the unmanned airplane 13. Accordingly, the site management system 10 enables the first propellers 56 to change their attitudes relative to the main body 52 without using a complicated mechanism, thereby easily ensuring the mounting strength of the first propellers 56.

The site management system 10 enables the movable front wings 54 (movable wings) provided in front of both the main wings 53 to rotate about a rotary shaft extending horizontally relative to the main body 52 in the unmanned airplane 13 and has the first propellers 56 as propulsive units in the movable front wings 54 (movable wings). Accordingly, the site management system 10 achieves improved stability and easy control by putting the unmanned airplane 13 in the airplane mode Mp, thereby enabling the balanced high speed flight. In addition, the site management system 10 achieves the stable low speed flight by putting the unmanned airplane 13 in the VTOL mode Mv. In the site management system 10, this makes the high speed flight and low speed flight of the unmanned airplane 13 stable while improving the fuel efficiency, thereby enabling quick movement and highly accurate sensing.

In the site management system 10, the unmanned airplane 13 can fly like a helicopter by standing the movable front wings 54 (the rotary wing parts 54b thereof) up in the VTOL mode Mv and rotating the first propellers 56 about the rotary shaft extending in an up-down direction. In the site management system 10, the unmanned airplane 13 can take off and land in a vertical direction in the VTOL mode Mv, so a launch pad or runway is not necessary and the entire structure can be small-sized, thereby improving the degree of freedom of a use place.

When any of a plurality of working processes performed is completed in the site management system 10, the unmanned airplane 13 is moved in the airplane mode Mp to the working place Ps executed by the completed working process, switching between the high speed flight in the airplane mode Mp and the low speed flight in the VTOL mode Mv is performed appropriately, and the shape of the working place Ps is detected by the unmanned airplane 13. Accordingly, the site management system 10 can move the unmanned airplane 13 to the corresponding working place Ps immediately after an working process is completed to immediately detect the shape of the working place Ps. In addition, since the site management system 10 detects the shape of the working place Ps using the unmanned airplane 13 flying in the airplane mode Mp or the VTOL mode Mv, it is possible to detect the shape of the working place Ps at the accuracy requested in the civil construction site CS without interfering with the work in the civil construction site CS.

Therefore, the site management system 10 according to the first embodiment of the invention can perform measurement safely even in the vicinity of the working vehicles 12.

Embodiment 2

Next, a site management system 10A as a site management system according to a second embodiment of the invention will be described with reference to FIGS. 7 and 8. The site management system 10A according to the second embodiment is an example using in-flight detection processing different from that of the site management system 10 in the first embodiment. Since the site management system 10A according to the second embodiment has basically the same structure and operation as those of the site management system 10 according to the first embodiment, the structure in FIGS. 1 and 2 is used to show the entire structure, the same components are given the same reference symbols, and detailed descriptions are omitted. Although FIG. 8 schematically shows an example in which the shape of the observation area Ai is detected by the unmanned airplane 13, this does not necessarily match an actual aspect.

In the site management system 10A according to the second embodiment, only in-flight detection processing is different and the others are similar to those of the site management system 10, so the appearance is the same as in the site management system 10. In the in-flight detection processing, as in the first embodiment, the unmanned airplane 13 moves to the observation area Ai in the airplane mode Mp according to a flight plan, performs sensing on the observation area Ai by switching between the high speed flight in the airplane mode Mp and the low speed flight in the VTOL mode Mv appropriately, and detects the shape of the observation area Ai. In the in-flight detection processing according to the second embodiment, unlike the first embodiment, the observation area Ai (see FIG. 8) is preset and the shape of the observation area Ai is detected periodically. Accordingly, in the in-flight detection processing according to the second embodiment, a predetermined (time) interval Ti is preset to detect the shape periodically. The predetermined interval Ti may be set by operating the operation input unit 24 of the external control apparatus 11 or may be obtained from an external device.

Figure 7:
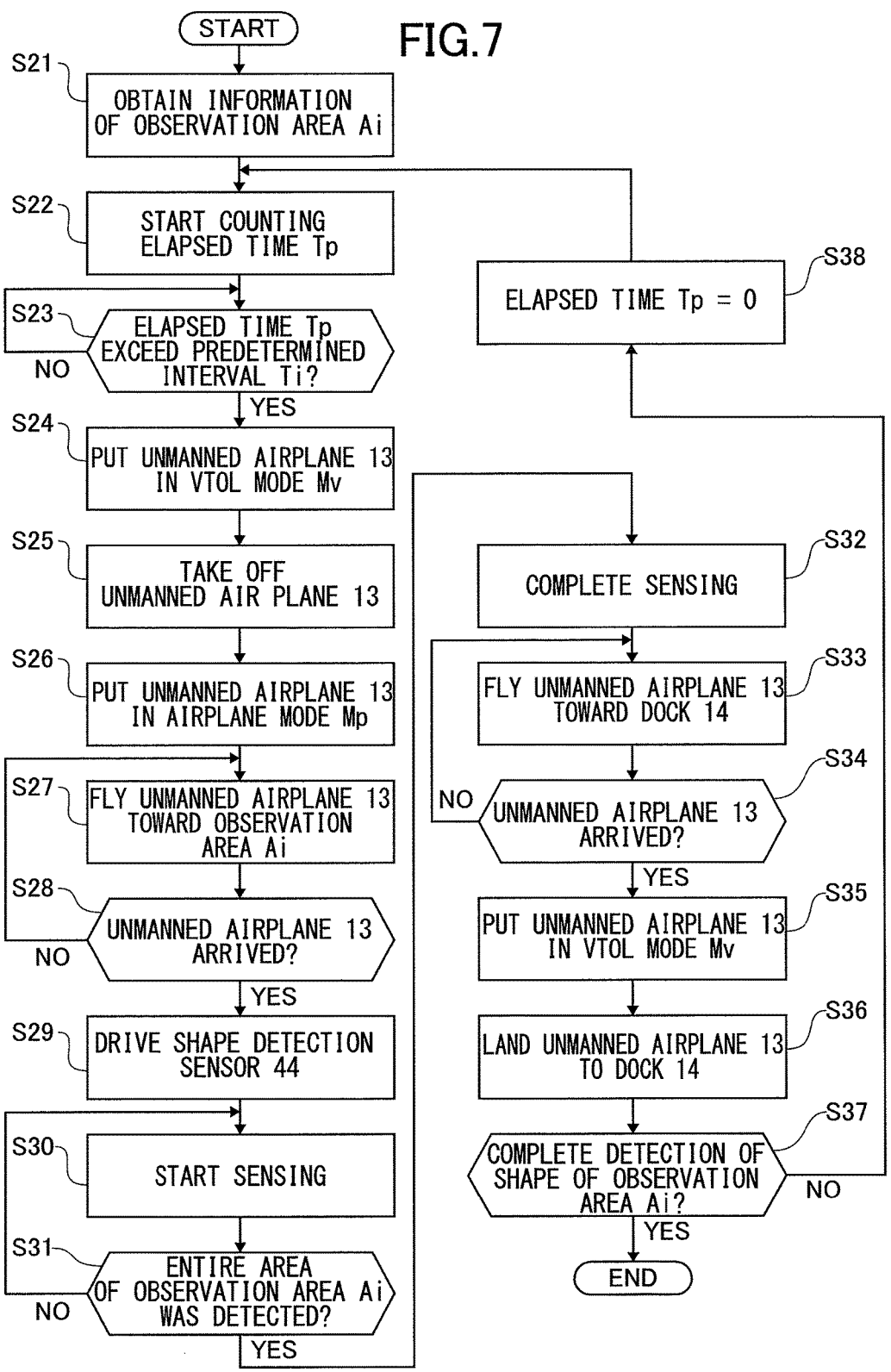
FIG. 7 is a flowchart showing another example of in-flight detection processing executed in, for example, the integrated control unit of a site management system according to a second embodiment.
Figure 8:
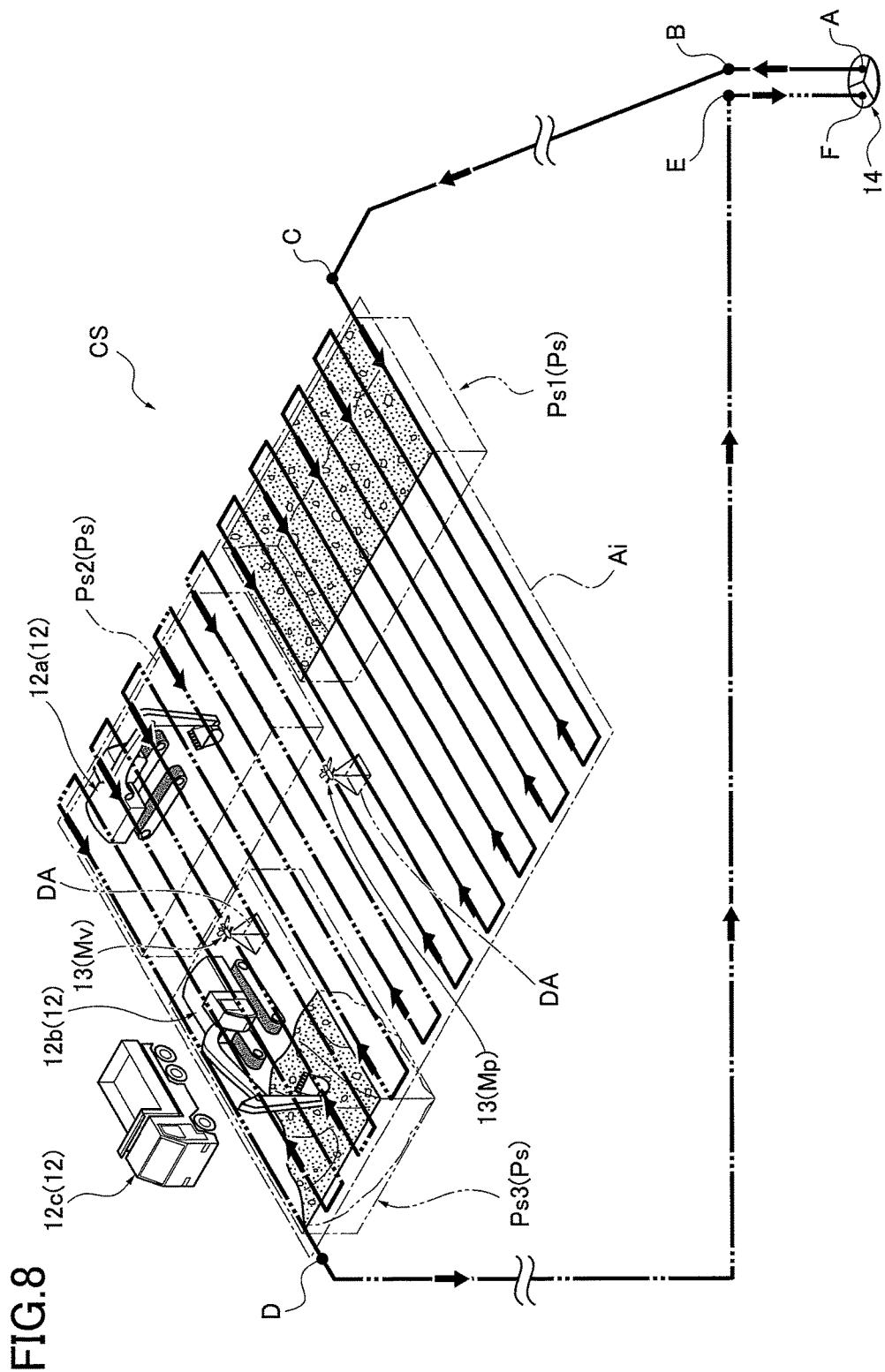
FIG. 8 is an explanatory view for explaining how the unmanned airplane detects the shape of the set observation area in the site management system.

FIG. 7 is a flowchart showing the in-flight detection processing (in-flight detection method) performed by the integrated control unit 21 according to the second embodiment. The in-flight detection processing is performed by the integrated control unit 21 according to a program stored in the internal memory 21a of the integrated control unit 21 or the storage unit 25. The in-flight detection processing is started by supplying the power to the unmanned airplane 13. When the in-flight detection processing is started, an elapsed time Tp is reset to 0 (zero).

In step S21, information of the observation area Ai is obtained, and the processing proceeds to step S22. In step S21, information (position, shape, and size) of the preset observation area Ai is obtained and set as the area (that is, the area in the civil construction site CS observed using the unmanned airplane 13) for which the shape of the civil construction site CS is detected by the shape detection sensor 44 using the unmanned airplane 13 in the VTOL mode Mv. The observation area Ai may be set in any point in the civil construction site CS. For example, if the observation area Ai is set so as to include the working places Ps of a plurality of working processes currently being performed, the progress statuses of the working processes can be checked appropriately. The observation area Ai may be set by operating the operation input unit 24 of the external control apparatus 11 or may be obtained from an external device. Therefore, in step S21, information of the preset observation area Ai is obtained, and the flight plan for the unmanned airplane 13 used to observe the observation area Ai is set. The method for setting the flight plan is the same as in the first embodiment.

In step S22, following step S21 in which information of the observation area Ai is obtained or step S38 in which the elapsed time Tp is set to 0, the counting of the elapsed time Tp is started, and the processing proceeds to step S23. In step S22, the counting of the elapsed time Tp is started to detect the shape periodically.

In step S23, following step S22 in which the counting of the elapsed time Tp is started, a decision is made as to whether the elapsed time Tp exceeds the predetermined interval Ti, and the processing proceeds to step S24 in the case of Yes or repeats step S23 in the case of No. In step S23, after starting the counting of the elapsed time Tp (step S22), the processing determines whether the set predetermined time (predetermined interval Ti) has elapsed. Then, the process is repeated until the predetermined time (predetermined interval Ti) elapses. Since the predetermined interval Ti is set in step S23 as an interval used to detect the shape periodically, when the elapsed time Tp has exceeded the predetermined interval Ti (that is, predetermined time (predetermined interval Ti) has elapsed), the processing proceeds to step S24 to detect the shape periodically.

In step S24, following step S23 in which it is determined that the elapsed time Tp has exceeded the predetermined interval Ti, the unmanned airplane 13 is put in the VTOL mode Mv, and the processing proceeds to step S25. Step S24 is similar to step S3 in the flowchart in FIG. 5.

In step S25, following step S24 in which the unmanned airplane 13 is put in the VTOL mode Mv, the unmanned airplane 13 is taken off, and the processing proceeds to step S26. Step S25 is similar to step S4 in the flowchart in FIG. 5.

In step S26, following step S25 in which the unmanned airplane 13 is taken off, the unmanned airplane 13 is put in the airplane mode Mp, and the processing proceeds to step S27. Step S26 is similar to step S5 in the flowchart in FIG. 5.

In step S27, following step S26 in which the unmanned airplane 13 is put in the airplane mode Mp or step S28 in which it is determined that the unmanned airplane 13 has not reached the point, the unmanned airplane 13 starts flight toward the observation area Ai, and the processing proceeds to step S28. Step S27 is similar to step S6 in the flowchart in FIG. 5.

In step S28, following step S27 in which the unmanned airplane 13 starts flight toward the observation area Ai, a decision is made as to whether the unmanned airplane 13 has reached the point, and the processing proceeds to step S29 in the case of Yes or returns to step S27 in the case of No. Step S28 is similar to step S7 in the flowchart in FIG. 5.

In step S29, following step S28 in which it is determined that the unmanned airplane 13 has reached the point, the shape detection sensor 44 is driven, and the processing proceeds to step S30. Step S29 is similar to step S8 in the flowchart in FIG. 5.

In step S30, following step S29 in which the shape detection sensor 44 is driven or step S31 in which it is determined that the entire area of the observation area Ai has not been detected, sensing is started or continued, and the processing proceeds to step S31. In step S30, the unmanned airplane 13 is flown while the shape detection sensor 44 is driven, the detection area DA (see FIG. 8 and so on) is defined above the observation area Ai, and the detection (that is, sensing) of the shape of the observation area Ai is started. In step S30, as in step S9 in the flowchart in FIG. 5, switching between the high speed flight in the airplane mode Mp and the low speed flight in the VTOL mode Mv is performed appropriately to perform sensing (sensing processing) of the observation area Ai. In step S30, the detection area DA is moved to efficiently detect the entire area of the observation area Ai by flying the unmanned airplane 13 according to the flight route in the flight plan generated in step S21 for the observation area Ai. When detection in the VTOL mode Mv is performed according to the detection result in the airplane mode Mp as in step S9, the flight plan (the flight route thereof) for the observation area Ai is updated. In step S30, the detection result of sensing is obtained from the shape detection sensor 44 via the unmanned airplane side communication unit 43 and the control side communication unit 22 and the detection result is stored in the internal memory 21a or the storage unit 25.

In step S31, following step S30 in which sensing is started, a decision is made as to whether the entire area of the observation area Ai is detected, and the processing proceeds to step S32 in the case of Yes or returns to step S30 in the case of No. Step S31 is similar to step S10 in the flowchart in FIG. 5.

In step S32, following step S31 in which it is determined that the entire area of the observation area Ai has been detected, sensing is completed, and the processing proceeds to step S33. Step S32 is similar to step S11 in the flowchart in FIG. 5.

In step S33, following step S32 in which sensing is completed or step S34 in which it is determined that the unmanned airplane 13 has not reached the point, the unmanned airplane 13 starts or continues flight toward the dock 14, and the processing proceeds to step S34. Step S33 is similar to step S12 in the flowchart in FIG. 5.

In step S34, following step S33 in which the unmanned airplane 13 starts flight toward the dock 14, a decision is made as to whether the unmanned airplane 13 has reached the point, and the processing proceeds to step S35 in the case of Yes or returns to step S33 in the case of No. Step S34 is similar to step S13 in the flowchart in FIG. 5.

In step S35, following step S34 in which it is determined that the unmanned airplane 13 has reached the point, the unmanned airplane 13 is put in the VTOL mode Mv, and the processing proceeds to step S36. Step S35 is similar to step S14 in the flowchart in FIG. 5.

In step S36, following step S35 in which the unmanned airplane 13 is put in the VTOL mode Mv, the unmanned airplane 13 is landed, and the processing proceeds to step S37. In step S36, the first propellers 56 and the second propellers 57 of the unmanned airplane 13 in the VTOL mode Mv are appropriately driven, the feet 51 are extended while the unmanned airplane 13 is lowered, and the unmanned airplane 13 is landed on the dock 14 with the feet 51 placed on the upper surface 14a.

In step S37, following step S36 in which the unmanned airplane 13 is landed, a decision is made as to whether detection of the shape of the observation area Ai is completed, and the processing is completed in the case of Yes or returns to step S38 in the case of No. In step S37, the decision is made as to whether periodical observation (using the unmanned airplane 13) of the observation area Ai from which information has been obtained in step S21 is completed. In the first embodiment, when an operation for completion or an operation for setting the new observation area Ai is performed on the operation input unit 24, it is determined that the periodical observation (using the unmanned airplane 13) of the observation area Ai from which information has been obtained in step S21 is completed.

In step S38, following step S37 in which it is determined that the detection of the shape of the observation area Ai has not been completed, the elapsed time Tp is set to 0 (zero) and the processing returns to step S22. In step S38, since the periodical observation (using the unmanned airplane 13) of the observation area Ai from which information has been obtained in step S21 continues, the elapsed time Tp is set (reset) to 0 (zero) (Tp=0) to newly start the counting for periodical detection of the shape.

Next, operation during observation of the civil construction site CS using the unmanned airplane 13 of the site management system 10A according to the second embodiment will be described with reference to FIG. 8. In the example in FIG. 8, as in the example in FIG. 6, there are two excavators (working vehicle 12a and working vehicle 12b) and one dump truck (working vehicle 12c) in the civil construction site CS. In the example in FIG. 8, as in the example in FIG. 6, the working vehicle 12a has completed the execution of the first working place Ps1 and is shifting to the execution of the second working place Ps2, the working vehicle 12b is performing the execution of the third working place Ps3, and the working vehicle 12c is transferring excavated material resulting from the work by the working vehicle 12b. In the example in FIG. 8, the observation area Ai is set as a rectangular area including the first working place Ps1, the second working place Ps2, and the third working place Ps3. In the example in FIG. 8, sensing in the VTOL mode Mv is set for the first working place Ps1, the second working place Ps2, and the third working place Ps3 and sensing in the airplane mode Mp is set for the places other than these places in the observation area Ai.

First, in the site management system 10A, the working vehicles 12 (12a, 12b, and 12c) are driven under the control of the external control apparatus 11 (the integrated control unit 21 thereof) as shown in FIG. 8 and the above working processes are performed in the civil construction site CS. In the site management system 10A, the power to the unmanned airplane 13 is turned on to enable observation using the unmanned airplane 13. Then, in the site management system 10A, the processing proceeds to step S21 in the flowchart in FIG. 7 to obtain information (position, shape, and size) of the preset observation area Ai and set the preset observation area Ai as the area for which the shape is detected by the unmanned airplane 13 in the VTOL mode Mv. After that, the processing proceeds to step S22 and then step S23 in the flowchart in FIG. 7 and repeats the process until the predetermined time (predetermined interval Ti) elapses. Accordingly, the unmanned airplane 13 stands-by on the dock 14 (see position A).

Then, when the predetermined time (predetermined interval Ti) elapses, the processing proceeds to step S23 and then step S24 in the flowchart in FIG. 7 to put the unmanned airplane 13 in the VTOL mode Mv (see FIG. 4), and the processing proceeds to step S25 to get the unmanned airplane 13 off the dock 14 (see FIG. 1) vertically (see the route from position A to position B). After that, the processing proceeds to step S26 in the flowchart in FIG. 7 to put the unmanned airplane 13 in the airplane mode Mp (see FIG. 3), the processing proceeds to step S27 and then step S28, and the processing repeats the process to move the unmanned airplane 13 from a position above the dock 14 to the first arrival point (see the route from position B to position C) in the observation area Ai.

Then, the processing proceeds to step S29 in the flowchart in FIG. 7 to drive the shape detection sensor 44 of the unmanned airplane 13, the processing proceeds to step S30 and then step S31 to put the unmanned airplane 13 in the VTOL mode Mv (see FIG. 4), and the processing starts sensing of the observation area Ai in the VTOL mode Mv (see position C). When the unmanned airplane 13 falls outside the first working place Ps1 by repeating step S30 and step S31 in the flowchart in FIG. 7, the unmanned airplane 13 is put in the airplane mode Mp (see FIG. 3) and starts sensing in the airplane mode Mp. After that, by repeating step S30 and step S31 in the flowchart in FIG. 7, when the unmanned airplane 13 moves to a position above the first working place Ps1, the second working place Ps2, or the third working place Ps3 in the observation area Ai, the unmanned airplane 13 is put in the VTOL mode Mv (see FIG. 4); and when the unmanned airplane 13 falls outside the places, the unmanned airplane 13 is put in the airplane mode Mp (see FIG. 3). By repeating step S30 and step S31 in the flowchart in FIG. 7, the site management system 10A performs sensing while moving the detection area DA by flying the unmanned airplane 13. Then, the observation area Ai (that is, the entire area of a rectangular area including the first working place Ps1, the second working place Ps2, and the third working place Ps3) is detected efficiently (see the route from position C to position D). Accordingly, the site management system 10A can detect the shape of the civil construction site CS including the first working place Ps1, the second working place Ps2, and the third working place Ps3 in the preset observation area Ai at the high resolution corresponding to sensing in the VTOL mode Mv. Therefore, it is possible to accurately detect the shapes of the first working place Ps1 just after being executed, the second working place Ps2 being executed, and the third working place Ps3 before being executed. In addition, the site management system 10A can immediately detect the shape of the civil construction site CS excluding the first working place Ps1, the second working place Ps2, and the third working place Ps3 in the preset observation area Ai at the resolution corresponding to sensing in the airplane mode Mp.

After that, the processing proceeds to step S32 in the flowchart in FIG. 7 to stop the driving of the shape detection sensor 44 and sensing and puts the unmanned airplane 13 in the airplane mode Mp (see FIG. 3). Then, the processing proceeds to step S33 and step S34 and repeats the steps to move the unmanned airplane 13 from the observation area Ai (the first working place Ps1) to a position above the dock 14 (see the route from position D to position E). After that, the processing proceeds to step S35 in the flowchart in FIG. 7 to put the unmanned airplane 13 in the VTOL mode Mv (see FIG. 4), and the processing proceeds to step S36 to let the unmanned airplane 13 land on the dock 14 vertically (see the route from position E to position F). Then, the site management system 10A supplies and charges electric power to the unmanned airplane 13 (the charge mechanism unit 48 thereof) via the feet 51 from the dock 14. After that, until an operation for completing the detection of the shape of the set observation area Ai or an operation for setting the new observation area Ai is performed on the operation input unit 24, the processing proceeds to step S37, step S38, and step S22 in the flowchart in FIG. 7 and repeats the above operation. With this, the site management system 10A detects the shape of the preset observation area Ai using sensing by the unmanned airplane 13 each time the predetermined time (predetermined interval Ti) elapses.

As describe above, each time the predetermined time (predetermined interval Ti) elapses, the site management system 10A moves the unmanned airplane 13 to the preset observation area Ai in the airplane mode Mp, detects the shape of the observation area Ai using sensing (sensing in both the airplane mode Mp and the VTOL mode Mv in the example in FIG. 8) by the unmanned airplane 13, and returns the unmanned airplane 13 in the airplane mode Mp. Accordingly, each time the predetermined time (predetermined interval Ti) elapses, the site management system 10A can accurately detect the shape of the observation area Ai (that is, the shapes of the first working place Ps1, the second working place Ps2, and the third working place Ps3) and quickly detect the shapes of other places.

Since the site management system 10A according to the second embodiment of the invention has basically the same structure as the site management system 10 according to the first embodiment, basically the same effects as in the first embodiment can be obtained.

In addition, each time the predetermined time (predetermined interval Ti) elapses, the site management system 10A according to the second embodiment observes the observation area Ai using the unmanned airplane 13. That is, the site management system 10A detects the shape of the observation area Ai using the shape detection sensor 44 of the unmanned airplane 13 flying in the airplane mode Mp or the VTOL mode Mv. Accordingly, the site management system 10A can periodically check the progress statuses of working processes in the observation area Ai without interfering with the work by the working vehicles 12 and can detect whether the shape, size, height, position, and the like of the working place Ps in the completed working process have been executed at a desired accuracy.

In addition, since the site management system 10A can arbitrarily set the observation area Ai, which is an area observed using the unmanned airplane 13 in the civil construction site CS, it is possible to perform periodical observation so as to appropriately respond to working processes planned in the civil construction site CS.

In addition, since the site management system 10A can arbitrarily set the predetermined interval Ti used to determine the elapse of a predetermined time, it is possible to perform periodical observation so as to respond to the execution stage and execution content in the civil construction site CS.

The site management system 10A can check information in relation to the progress statuses and execution accuracies of the plurality of working places Ps by setting the observation area Ai so as to include a plurality of working places Ps. Accordingly, the site management system 10A can check the working places Ps in a larger range and the statuses of the working places Ps while considering the progress status of the entire construction. In addition, the site management system 10A can detect the shape by switching between the high speed flight in the airplane mode Mp and the low speed flight in the VTOL mode Mv appropriately in the observation area Ai, thereby enabling more appropriate detection of the entire shape at a desired accuracy.

Accordingly, the site management system 10A according to the second embodiment of the invention can perform measurement safely even in the vicinity of the working vehicles 12.

Although a single observation area Ai is set and the shape of the observation area Ai is periodically detected in the second embodiment above, the invention is not limited to the structure of the second embodiment and a plurality of observation areas Ai may be set and the shapes of the observation areas Ai may be detected periodically. In this case, the shapes of the plurality of the observation areas Ai may be detected in sequence, the detection interval of the shape may differ for each of the observation areas Ai, and the timing or the order of the detection of the shapes of the observation areas Ai may be set appropriately.

Although the site management systems 10 and 10A have been described as examples of a site management system according to the invention in the above embodiments, the invention is not limited to the above embodiments as long as the site management system includes an unmanned airplane in which switching between an airplane mode for high speed flight and a VTOL mode for low speed flight is enabled, a working vehicle working in a civil construction site, a shape detection sensor provided in the unmanned airplane, the shape detection sensor being driven to detect a shape of the civil construction site, and an external control apparatus controlling flight of the unmanned airplane, driving of the working vehicle, and driving of the shape detection sensor, in which the external control apparatus moves the unmanned airplane to an observation area in the civil construction site by performing the high speed flight of the unmanned airplane in the airplane mode and detects a shape of the observation area by driving the shape detection sensor while performing the high speed flight of the unmanned airplane in the airplane mode or by driving the shape detection sensor while performing the low speed flight of the unmanned airplane by switching from the airplane mode to the VTOL mode.

In addition, in the in-flight detection processing (in-flight detection method) according to the above first embodiment, when any of the working processes is completed, the working place Ps executed by the completed working process is set as the observation area Ai and the shape of the observation area Ai is detected by the unmanned airplane 13 (the shape detection sensor 44 thereof). On the other hand, in the in-flight detection processing (in-flight detection method) according to the above second embodiment, the observation area Ai is preset in the civil construction site CS and the shape of the observation area Ai is periodically detected by the unmanned airplane 13. However, the timing of detection of the observation area Ai and the shape of the observation area Ai may be set arbitrarily and the invention is not limited to the structures of the above embodiments as long as the unmanned airplane 13 is moved in the airplane mode Mp toward the observation area Ai set in the civil construction site CS, the shape detection sensor 44 of the unmanned airplane 13 is driven, and the unmanned airplane 13 (the shape detection sensor 44 thereof) is flown in the airplane mode Mp or the VTOL mode Mv to detect the shape of the observation area Ai.

In addition, the in-flight detection processing (in-flight detection method) according to the above first embodiment detects the shape by setting the working place Ps executed by a completed working process as the observation area Ai and the in-flight detection processing (in-flight detection method) according to the above second embodiment periodically detects the shape of the preset observation area Ai. However, both embodiments may be combined. That is, the shape may be detected by setting the working place executed by the completed working process as the observation area (completed observation area) while the shape of the preset observation area (periodical observation area) is periodically detected, and the invention is not limited to the structures of the above embodiments.

The above embodiments adopt examples of the civil construction sites CS shown in FIGS. 6 and 8. However, the civil construction site CS may be a road, river, agricultural field, railroad, bridge, water supply and sewerage system, electric power generation facility, lighthouse, port and harbor, bank, city, or the like, and the invention is not limited to the above embodiments.

The above embodiments adopt examples in which a 360 degree camera and laser scanning device are used as the shape detection sensor 44. However, the shape detection sensor 44 only needs to detect the shape of the civil construction site CS (the observation area Ai thereof) from the unmanned airplane 13 performing low speed flight in the VTOL mode Mv and may be the above hyper-spectrum camera or may have another structure and is not limited to the above embodiments. When the hyper-spectrum camera is used as the shape detection sensor 44, various types of information such as the type of soil and the amount of water may be detected in addition to the shape of the civil construction site CS (observation area Ai). Accordingly, the work efficiency of the working vehicles 12 can be improved by detecting, for example, the type of soil and the amount of water during or before execution and transmitting such information to the working vehicles 12. Particularly in a structure in which the vehicle driving mechanism unit 33 is automatically driven, the work efficiency is improved and the work can be performed more appropriately by changing the magnitude of force and the aspect of operation depending on the type of soil and the amount of water.

In the above embodiments, the unmanned airplane 13 has the structure shown in FIGS. 3 and 4. However, the unmanned airplane may have another shape and structure in which, for example, the number of vertical tails provided on the main body (52) may be one, the shape of a point (52a) at which the second propellers 57 are provided may be changed, or the shapes of the main body (52) and both the movable front wings (54) may be changed as long as switching between the airplane mode for high speed flight and the VTOL mode for low speed flight is enabled and the invention is not limited to the structures of the above embodiments.

In the above embodiments, the first propellers 56 as propulsive units are provided in both the movable front wings 54 of the unmanned airplane 13. However, the propulsive units are not limited to the above structures of the embodiments as long as they provide a thrust force for the main body (52) and can change their attitudes (output direction) relative to the main body (52).

The site management systems according to the embodiments of the invention have been described above, but the specific structure is not limited to the embodiments and the design may be changed or added without departing from the spirit of the invention.

What is claimed is:

1. A site management system comprising: an unmanned airplane being switchable between an airplane mode for high speed flight and a VTOL mode for low speed flight;
    a working vehicle working in a civil construction site;
    a shape detection sensor provided in the unmanned airplane, the shape detection sensor being driven to detect a shape of the civil construction site; and
    a single external control apparatus that controls flight of the unmanned airplane, driving of the working vehicle, and driving of the shape detection sensor in cooperation with each other,
    wherein the external control apparatus sets an observation area within the civil construction site and moves the unmanned airplane to the observation area in the civil construction site by performing the high speed flight of the unmanned airplane in the airplane mode, the observation area includes at least a working place in which the working vehicle executes a working process, and the external control apparatus detects a shape of the observation area by driving the shape detection sensor while performing the high speed flight of the unmanned airplane in the airplane mode or by driving the shape detection sensor while performing low speed flight of the unmanned airplane by switching from the airplane mode to the VTOL mode.

2. The site management system according to claim 1, wherein the external control apparatus detects the shape by driving the shape detection sensor while performing the low speed flight of the unmanned airplane in the VTOL mode in at least a part of the observation area.

3. The site management system according to claim 1, wherein the unmanned airplane includes a main body, a moveable wing provided on the main body, and a propulsive unit provided on the moveable wing to change an attitude of the unmanned airplane, and the external control apparatus switches between the airplane mode and the VTOL mode by changing the attitude of the propulsive unit relative to the main body.

4. The site management system according to claim 3, wherein the propulsive unit is a propeller provided in the movable wing.

5. The site management system according to claim 4, wherein the unmanned airplane has a main wing provided on the main body, and the movable wing is provided in front of the main wing in the main body and is rotatable about a rotary shaft extending horizontally from the main body.

6. The site management system according to claim 1, wherein the external control apparatus is capable of obtaining work progress information from the working vehicle and, each time the working vehicle completes work at a place, the external control apparatus sets the place executed by the completed work as the observation area and detects the shape of the observation area using the unmanned airplane.

7. The site management system according to claim 1, wherein the external control apparatus sets a predetermined range in the civil construction site as the observation area and periodically detects the shape of the observation area using the unmanned airplane.

8. A in-flight detection method using an unmanned airplane being switchable between an airplane mode for high speed flight and a VTOL mode for low speed flight, a working vehicle working in a civil construction site, and a shape detection sensor provided in the unmanned airplane, the shape detection sensor being driven to detect a shape of the civil construction site, the method comprising the steps of:

setting an observation area within the civil construction site, the observation area including at least a working place in which the working vehicle executes a working process;

moving the unmanned airplane to the observation area in the civil construction site by performing the high speed flight of the unmanned airplane in the airplane mode;

driving the shape detection sensor of the unmanned airplane;

detecting a shape of the observation area by performing the high speed flight of the unmanned airplane in the airplane mode while driving the shape detection sensor or by performing the low speed flight of the unmanned airplane while driving the shape detection sensor; and controlling flight of the unmanned airplane, driving of the working vehicle, and driving of the shape detection sensor in cooperation with each other by a single external control apparatus.

9. The in-flight detection method according to claim 8, further comprising the step of:

detecting the shape by performing the low speed flight of the unmanned airplane in the VTOL mode while driving the shape detection sensor in at least a part of the observation area.

10. The in-flight detection method according to claim 8 further comprising:

obtaining work progress information from the working vehicle, and each time the working vehicle completes work at a place, setting the place executed by the completed work as the observation area and detecting the shape of the observation area using the unmanned airplane.

11. A non-transitory computer readable medium storing a program for executing a control process with a single external control apparatus, the control process comprising:

setting an observation area within a civil construction site, the observation area including at least a working place in which a working vehicle executes a working process;

moving an unmanned airplane to the observation area in the civil construction site by performing high speed flight of the unmanned airplane in an airplane mode;

driving a shape detection sensor provided in the unmanned airplane to detect a shape of the civil construction site;

detecting the shape of the observation area by performing the high speed flight of the unmanned airplane in the airplane mode while driving the shape detection sensor or performing low speed flight of the unmanned airplane in a VTOL mode while driving the shape detection sensor; and controlling flight of the unmanned airplane, driving of the working vehicle, and driving of the shape detection sensor in cooperation with each other by the single external control apparatus.

12. The control process executed by the program stored in the computer readable medium of claim 11 further comprising:

detecting the shape by performing the low speed flight of the unmanned airplane in the VTOL mode while driving the shape detection sensor in at least a part of the observation area.

13. The control process executed by the program stored in the computer readable medium of claim 11 further comprising:

obtaining work progress information from the working vehicle, and each time the working vehicle completes work at a place, setting the place executed by the completed work as the observation area and detecting the shape of the observation area using the unmanned airplane.

* * * * *